(12) United States Patent
Sharifie et al.

(10) Patent No.: US 12,292,795 B2
(45) Date of Patent: *May 6, 2025

(54) DATA RECOVERY USING ORDERED DATA REQUESTS

(71) Applicant: Micron Technology, Inc., Boise, ID (US)

(72) Inventors: Tal Sharifie, Lehavim (IL); Chandrakanth Rapalli, Hyderabad (IN); Yoav Weinberg, Toronto (CA)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/416,967

(22) Filed: Jan. 19, 2024

(65) Prior Publication Data

US 2024/0160526 A1 May 16, 2024

Related U.S. Application Data

(63) Continuation of application No. 18/048,289, filed on Oct. 20, 2022, now Pat. No. 11,914,473.

(51) Int. Cl.
*G06F 11/10* (2006.01)
*G06F 11/07* (2006.01)

(52) U.S. Cl.
CPC ...... *G06F 11/1068* (2013.01); *G06F 11/0793* (2013.01); *G06F 11/1004* (2013.01)

(58) Field of Classification Search
None
See application file for complete search history.

(56) References Cited

U.S. PATENT DOCUMENTS

| | | | | |
|---|---|---|---|---|
| 6,360,290 B1 * | 3/2002 | Avritch | ............... | G06F 13/387 |
| | | | | 710/104 |
| 7,836,329 B1 * | 11/2010 | Singhal | ............... | G06F 11/2294 |
| | | | | 714/733 |
| 10,141,034 B1 * | 11/2018 | Zitlaw | ............... | G06F 11/3055 |
| 2005/0081127 A1 * | 4/2005 | Rowlands | ......... | G06F 11/0784 |
| | | | | 714/E11.176 |

(Continued)

OTHER PUBLICATIONS

"IEEE Standard for Scalable Storage Interface," in IEEE Std 1285-2005, vol., No., pp. 1-140, Mar. 22, 2006, (Year: 2006).*

(Continued)

*Primary Examiner* — Daniel F. McMahon
(74) *Attorney, Agent, or Firm* — Holland & Hart LLP

(57) ABSTRACT

Methods, systems, and devices for data recovery using ordered data requests are described. In some examples, a memory system receives data units from a host device. A first controller of the memory system generates a protocol unit using the data units. A second controller of the memory system generates a data storage unit using data from the protocol unit, and stores the data unit to a memory device. The memory system performs error detection operations using respective sets of parity bits for each of the units. Upon detecting an error, the memory system, for a write operation, re-requests data associated with error and regenerate the units to correct for the error, or, for a read operation, re-read data associated with the error and regenerate the units to correct for the error.

20 Claims, 8 Drawing Sheets

(56) References Cited

U.S. PATENT DOCUMENTS

| | | | |
|---|---|---|---|
| 2007/0079080 A1* | 4/2007 | Sanders | G06F 3/0607 |
| | | | 711/154 |
| 2007/0101237 A1* | 5/2007 | Tamura | G11C 29/76 |
| | | | 714/763 |
| 2015/0347226 A1* | 12/2015 | Pawlowski | G06F 3/0659 |
| | | | 714/768 |
| 2017/0220419 A1* | 8/2017 | Kuo | G06F 11/1417 |
| 2020/0174865 A1* | 6/2020 | Kim | G06F 11/0793 |
| 2020/0293395 A1* | 9/2020 | Mills | G06F 11/10 |
| 2020/0356502 A1* | 11/2020 | Safranek | G06F 8/77 |
| 2022/0050787 A1* | 2/2022 | Siegel | G06F 12/0646 |
| 2023/0244532 A1* | 8/2023 | Hillel | G06F 9/5016 |
| | | | 718/104 |

OTHER PUBLICATIONS

"IEEE Standard for a High Performance Serial Bus Peer-to-Peer Data Transport Protocol (PPDT)," in IEEE Std 1394.3-2003, vol., No., pp. 1-68, Apr. 14, 2004, doi: 10.1109/IEEESTD.2004.94445. (Year: 2004).

* cited by examiner

DATA RECOVERY USING ORDERED DATA REQUESTS

CROSS REFERENCE

The present Application for Patent is a continuation of U.S. patent application Ser. No. 18/048,289 by Sharifie et al., entitled "DATA RECOVERY USING ORDERED DATA REQUESTS," filed Oct. 20, 2022, assigned to the assignee hereof, and is expressly incorporated by reference in its entirety herein.

FIELD OF TECHNOLOGY

The following relates to one or more systems for memory, including data recovery using ordered data requests.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
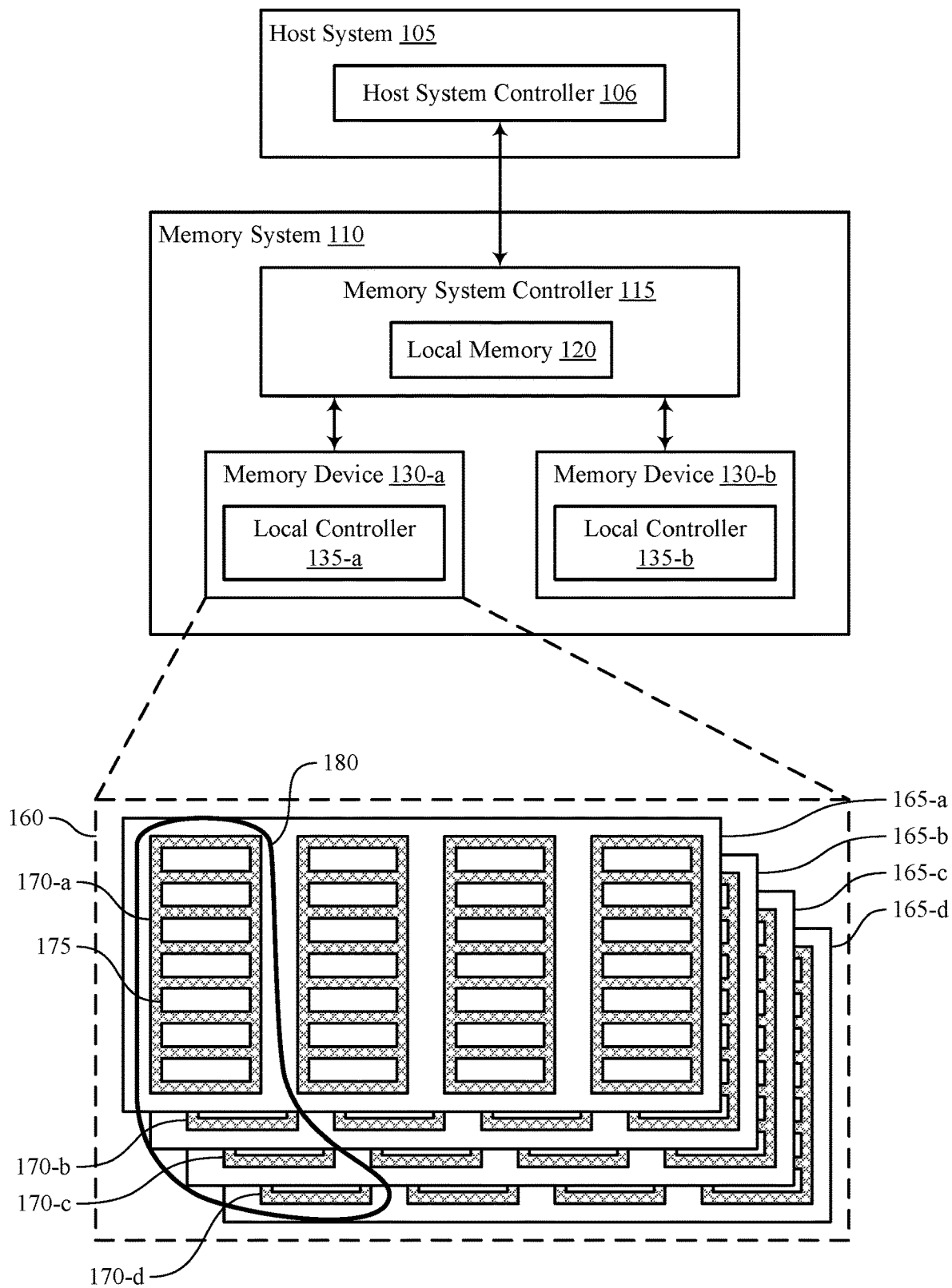
FIG. 1 illustrates an example of a system that supports data recovery using ordered data requests in accordance with examples as disclosed herein.

Some memory systems may include circuitry configured to detect errors associated with various operations or various components of the memory system. Such memory systems may be incorporated in environments such as vehicle safety systems, autonomous vehicle systems, or other safety-critical systems, that may have strict requirements. For example, a memory system may include error detection capabilities for data communicated between the memory system and a host system. However, in some instances, errors or faults associated with data that occur internal to the memory system may be detected but the data may not be recoverable without retransmission (e.g., for a write operation) or rereading (e.g., for a read operation) of the data. That is, if a fault exists in a data path of a memory system, data may still be written to or read from a memory device, but the data may be corrupt. Accordingly, techniques for enhancing error detection internally and retransmitting or rereading data to a memory system may be desirable.

Techniques for enhancing error detection internally and retransmitting or rereading data to a memory system are described herein. In some examples, the memory system may be configured to detect errors or faults in a data path by generating one or more sets of parity bits associated with data units received from a host system. For example, a controller (e.g., an interface controller, a UniPro® controller) of the memory system may receive data units from the host system and each data unit may include a respective set of parity bits. The controller may perform an error detection operation on the respective data units to identify potential errors in the data. The interface controller may generate a protocol unit (e.g., a Universal Flash Storage Protocol Information Unit (UPIU)), based on data included in each of the received data units, and may generate respective sets of parity bits that are included in the UPIU. In some examples, the respective sets of parity bits for the data units may be compared to parity bits generated for the corresponding data in the UPIU to identify potential errors in the data units or the UPIU. The interface controller may communicate the UPIU to a data storage controller of the memory system, which may process the UPIU by performing an error detection operation to identify potential errors in the UPIU (e.g., using the respective sets of parity bits). The data storage controller may process the UPIU to obtain a data storage unit and may generate respective sets of parity bits that are included in the data storage unit. In some examples, the respective sets of parity bits for the UPIU may be compared to parity bits generated for the corresponding data in the data storage unit to identify potential errors in the UPIU or the data storage unit. In some examples, the data and parity bits included in the data storage unit may be written to a memory device of the memory system. In other examples, as described herein, parity bits may also be generated, and error detection operations may be performed on data that is read from a memory device of the memory system.

In some cases, when determining errors in the data units, the UPIU, or the data storage unit, the memory system (e.g., the interface controller or the data storage controller, respectively) may regenerate the data units, the UPIU, or the data storage unit. In some cases (e.g., for a write operation), the memory system may communicate with the host system to request retransmission of the data units associated with the errors. In other cases (e.g., for a read operation), the memory system may reread the data storage units associated with the errors (e.g., reread the data storage units from a memory device of the memory system).

The memory system may reprocess the data units or the UPIU and perform error detection to verify that no errors (or relatively few errors) exist in the retransmitted or reread data. Accordingly, using parity bits (and performing error detection operations) associated with the data units, the UPIU, and the data storage unit, the memory system may detect errors that occur along the data path. The memory system may communicate with the host system (e.g., for the write operation) or utilize one or more internal components (e.g., for the read operation) to obtain valid data (e.g., data units, UPIU, data storage unit), which may improve the overall performance and reliability of the memory system.

Figure 2:
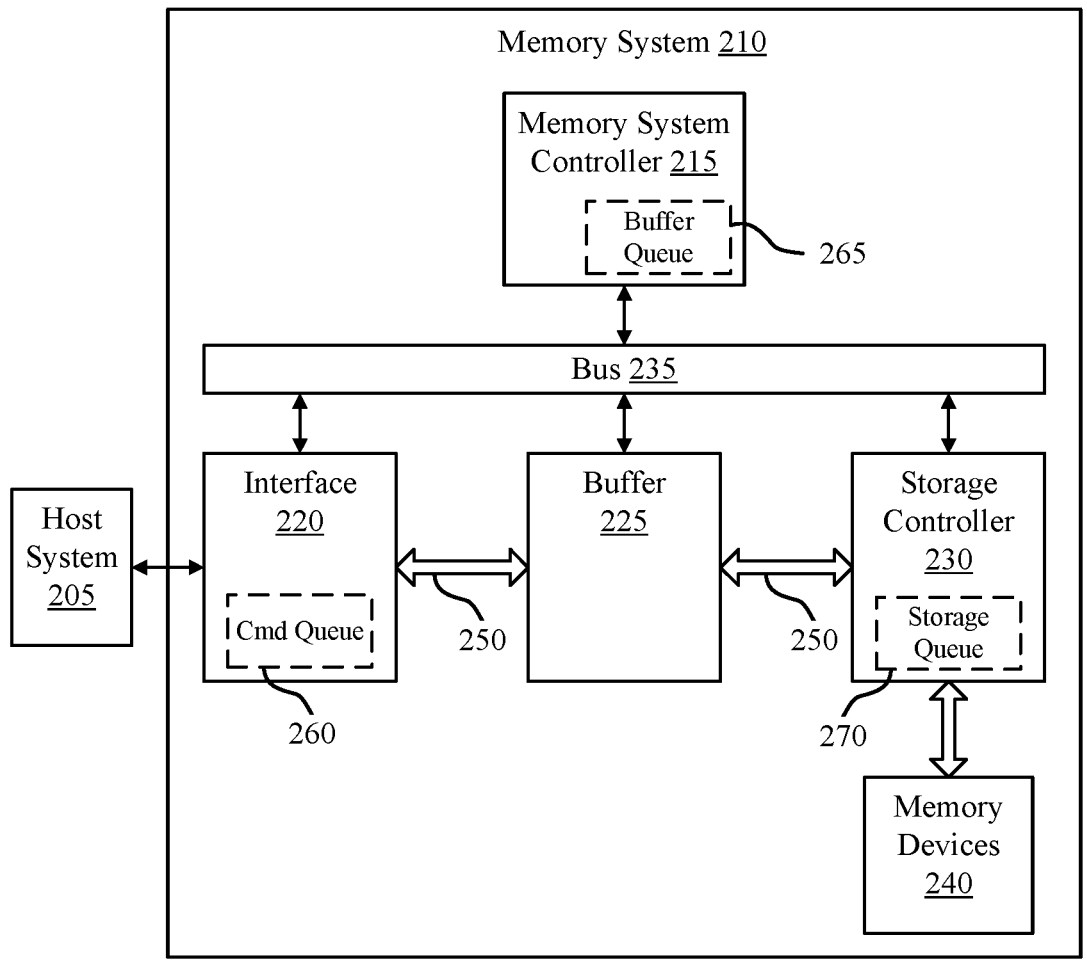
FIG. 2 illustrates an example of a system that supports data recovery using ordered data requests in accordance with examples as disclosed herein.

Features of the disclosure are initially described in the context of systems and devices, with reference to FIGS. 1 and 2. Features of the disclosure are described in the context of systems and process flows with reference to FIGS. 3 through 5. These and other features of the disclosure are further illustrated by and described in the context of a block diagram and flowcharts that relate to data recovery using ordered data requests with reference to FIGS. 6 through 8.

FIG. 1 illustrates an example of a system 100 that supports data recovery using ordered data requests in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support data recovery using ordered data requests. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The memory system controller 115 may include one or more controllers to perform the error control functions described herein. In some cases (e.g., for a write operation), the memory system controller 115 may receive data units from the host system 105. Each data unit may include a set of fields and a set of parity bits associated with the set of fields. Upon receiving the data units, the memory system controller 115 may perform an error detection operation by generating respective sets of parity bits to compare with the received sets of parity bits. The memory system controller 115 may generate a protocol unit (e.g., a UPIU) and respective sets of parity bits. In some examples, the respective sets of parity bits for the data units may be compared to parity bits generated for the corresponding data in the protocol unit to identify potential errors in the data units or the protocol unit. Upon generating the protocol unit, the memory system controller 115 may perform an error detection operation on the generated UPIU by generating respective sets of parity bits to compare with the received sets of parity bits. The memory system controller 115 may process the protocol unit to obtain a data storage unit. In some examples, the respective sets of parity bits for the protocol unit may be compared to parity bits generated for the corresponding data in the data storage unit to identify potential errors in the protocol unit or the data storage unit. In some examples, the memory system controller 115 may generate respective sets of parity bits for the data storage unit. The memory system controller 115 may store the data storage unit to a memory array of the memory system 110. By generating parity bits (and performing error detection operations) associated with the various units (e.g., data units, protocol units, data storage units), errors that occur along a data path of the memory system 110 may be detected and corrected.

In some cases (e.g., for a read operation), the memory system controller 115 may read a data storage unit from the memory array. Upon reading the data storage unit, the memory system controller 115 may perform an error detection operation to generate respective sets of parity bits to compare with the stored sets of parity bits associated with the data storage unit. The memory system controller 115 may generate one or more protocol units (e.g., a UPIU) and respective sets of parity bits. In some examples, the respective sets of parity bits for the data storage unit may be compared to parity bits generated for the corresponding data in the protocol units to identify potential errors in the data storage unit or the protocol units. The memory system controller 115 may perform an error detection operation by generating respective sets of parity bits to compare with the received sets of parity bits associated with the protocol units. The memory system controller 115 may generate one or more data units. In some examples, respective sets of parity bits for the protocol units may be compared to parity bits generated for the corresponding data in the data units to identify potential errors in the protocol units or the data units. The memory system controller 115 may transmit the data units to the host system 105. By generating parity bits (and performing error detection operations) associated with the various units (e.g., data units, protocol units, data storage units), errors that occur along the data path of the memory system 110 may be detected and corrected.

In some cases, when determining errors in the data units, the UPIU, or the data storage unit, the memory system controller 115 (e.g., the interface controller or the data storage controller, respectively) may regenerate the data units, the UPIU, or the data storage unit. In some cases (e.g., for a write operation), the memory system 110 may communicate with the host system 105 to request retransmission of the data units associated with the errors. In other cases (e.g., for a read operation), the memory system controller 115 may reread the data storage unit associated with the errors (e.g., reread the data storage units from the memory device 130 of the memory system 110). The memory system controller 115 may reprocess the data units or the UPIU and perform error detection to verify that no errors (or relatively few errors) exist in the retransmitted or reread data. Accordingly, using parity bits (and performing error detection operations) associated with the data units, the UPIU, and the data storage unit, the memory system controller 115 may detect errors that occur along the data path of the memory system 110. The memory system controller 115 may communicate with the host system (e.g., for the write operation) or utilize one or more internal components (e.g., for the read operation) to obtain valid data (e.g., data units, UPIU, data storage unit), which may improve the overall performance and reliability of the memory system 110.

FIG. 2 illustrates an example of a system 200 that supports data recovery using ordered data requests in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

Once the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

The memory system controller 215 may include one or more controllers to perform the error control functions described herein. In some cases (e.g., for a write operation), the memory system controller 215 may receive data units from the host system 105. Each data unit may include a set of fields and a set of parity bits associated with the set of fields. Upon receiving the data units, the memory system controller 215 may perform an error detection operation by generating respective sets of parity bits to compare with the received sets of parity bits. The memory system controller 125 may generate a protocol unit (e.g., a UPIU) and respective sets of parity bits. In some examples, the respective sets of parity bits for the data units may be compared to parity bits generated for the corresponding data in the protocol unit to identify potential errors in the data units or the protocol unit. Upon generating the protocol unit, the memory system controller 215 may perform an error detection operation on the generated UPIU by generating respective sets of parity bits to compare with the received sets of parity bits. The memory system controller 215 may process the protocol unit to obtain a data storage unit. In some examples, the respective sets of parity bits for the protocol unit may be compared to parity bits generated for the corresponding data in the data storage unit to identify potential errors in the protocol unit or the data storage unit. In some examples, the memory system controller 215 may generate respective sets of parity bits for the data storage unit. The memory system controller 215 may store the data storage unit to a memory array of the memory system 210. By generating parity bits (and performing error detection operations) associated with the various units (e.g., data units, protocol units, data storage units), errors that occur along the data path of the memory system 210 may be detected and corrected.

In some cases (e.g., for a read operation), the memory system controller 215 may read a data storage unit from the memory array. Upon reading the data storage unit, the memory system controller 215 may perform an error detection operation to generate respective sets of parity bits to compare with the stored sets of parity bits associated with the data storage unit. The memory system controller 215 may generate one or more protocol units (e.g., a UPIU) and respective sets of parity bits. In some examples, the respective sets of parity bits for the data storage unit may be compared to parity bits generated for the corresponding data in the protocol units to identify potential errors in the data storage unit or the protocol units. The memory system controller 215 may perform an error detection operation by generating respective sets of parity bits to compare with the received sets of parity bits associated with the protocol units. The memory system controller 215 may generate one or more data units. In some examples, respective sets of parity bits for the protocol units may be compared to parity bits generated for the corresponding data in the data units to identify potential errors in the protocol units or the data units. The memory system controller 215 may transmit the data units to the host system 205. By generating parity bits (and performing error detection operations) associated with the various units (e.g., data units, protocol units, data storage units), errors that occur along the data path of the memory system 210 may be detected and corrected.

In some cases, when determining errors in the data units, the UPIU, or the data storage unit, the memory system controller 215 (e.g., the interface controller or the data storage controller, respectively) may regenerate the data units, the UPIU, or the data storage unit. In some cases (e.g., for a write operation), the memory system 210 may communicate with the host system 205 to request retransmission of the data units associated with the errors. In other cases (e.g., for a read operation), the memory system controller 215 may reread the data storage unit associated with the errors (e.g., reread the data storage units from the memory device 240 of the memory system 210). The memory system controller 215 may reprocess the data units or the UPIU and perform error detection to verify that no errors (or relatively few errors) exist in the retransmitted or reread data. Accordingly, using parity bits (and performing error detection operations) associated with the data units, the UPIU, and the data storage unit, the memory system controller 215 may detect errors that occur along the data path of the memory system 210. The memory system controller 215 may communicate with the host system (e.g., for the write operation) or utilize one or more internal components (e.g., for the read operation) to obtain valid data (e.g., data units, UPIU, data storage unit), which may improve the overall performance and reliability of the memory system 210.

Figure 3:
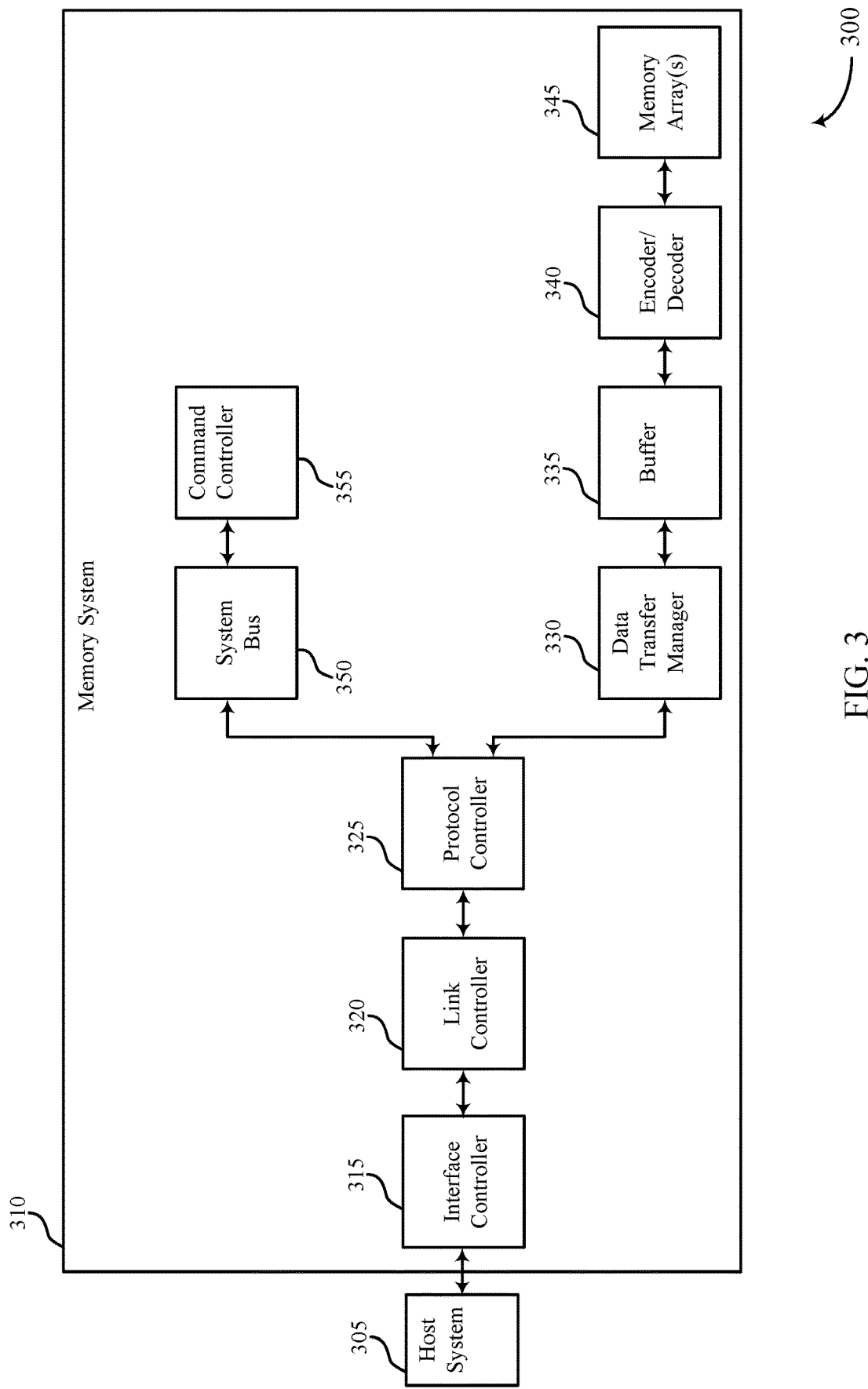
FIG. 3 illustrates an example of a system that supports data recovery using ordered data requests in accordance with examples as disclosed herein.

FIG. 3 illustrates an example of a system 300 that supports data recovery using ordered data requests in accordance with examples as disclosed herein. In some examples, the system 300 may include a host system 305 and a memory system 310. The host system 305 and the memory system 310 may be examples of the host system 205 and the memory system 210, respectively, as described with reference to FIG. 2. The memory system 310 may include an interface controller 315, a link controller 320, and a protocol controller 325. The memory system 310 may also include a data transfer manager (DTM) 330, a buffer 335, an encoder/decoder 340, and one or more memory arrays 345, which may be utilized when processing data. Additionally, or alternatively, the memory system 310 may include a controller 355 (e.g., a general-purpose command controller 355) and a system bus 350 which may be utilized when processing control information. The components of the memory system 310 may be configured to generate parity bits and perform error detection and correction operations associated with data paths of the memory system 310. Further, the components of the memory system 310 may obtain valid data by retransmitting data requests to the host system 305, or by rereading the data. By detecting and correcting errors that occur in the data and along data paths of the memory system 310, the overall performance and reliability of the memory system 310 may be improved.

The host system 305 may communicate with the memory system 310 via a host-driven logical block interface (e.g., an interface managed by the host system 305). For example, the host system 305 may transmit packets that include one or more payloads. As used herein, a data block may include data (e.g., data from respective payloads) from one or more packets received from the host system 305. In some instances, the payloads may be associated with respective commands (e.g., read commands, write commands, other commands) received from the host system 305. For example, the host system 305 may transmit a write command and one or more packets (e.g., that collectively correspond to a data block) to the memory system 310. Thus, a data block may refer to a unit of data transferred according to block access commands (e.g., a minimum addressable block size). The packets may be received by the interface controller 315 and commands included in the packets may be processed by the protocol controller 325.

In some examples, the host system 305 may communicate the packets to the interface controller 315, which may utilize a UniPro® protocol stack and may include a physical interface that includes one or more serial data lanes. As described herein, the interface controller 315 may be configured to generate protocol units (e.g., upon receiving a write command from the host system 305) and data units (e.g., upon receiving a read command from the host system 305) for communicating to the link controller 320 and the host system 305, respectively.

The memory system 310 may include a link controller 320 that is coupled with the interface controller 315. In some instances, the link controller 320 may be referred to as a Universal Flash Storage (UFS) link controller 320, and may operate according to a UFS protocol. The link controller 320 may receive protocol units from the interface controller 315, in the instance of a write operation, and may communicate the protocol units to the protocol controller 325. In the instance of read operations, the link controller 320 may receive protocol units from the protocol controller 325 and may communicate the protocol units to the interface controller 315.

In some examples, the memory system 310 may include a protocol controller 325 that is coupled with the link controller 320. The protocol controller 325 may operate according to a UFS protocol and may receive protocol units from the link controller 320 (e.g., during a write operation). As described herein, the interface controller 315 may utilize a UniPro® protocol stack. However, upon receiving a command (e.g., a read command) and performing certain operations on fields of the command to generate a protocol unit, the protocol unit may be communicated to the protocol controller 325 using signaling that is the same as or resembles UFS signaling (e.g., conforms to a UFS protocol). When the protocol controller 325 receives the protocol unit, it can either communicate the protocol unit to the DTM 330 if the protocol unit is associated with data or to the command controller 355 if the protocol unit is associated with control information. In some cases, the protocol units may be UPIUs. Further, each protocol unit may include an indicator of an offset corresponding to a set of logical addresses of the range of logical addresses in the memory array 345.

The DTM 330 may receive (e.g., obtain) and process the protocol unit. In some examples, the DTM 330 may process one or more protocol units to obtain a data storage unit, which may be written to a memory array 345. For example, the DTM 330 may generate respective sets of parity bits to compare with parity bits included in each protocol unit. The DTM 330 may generate (e.g., build) the data storage unit using one or more protocol units. In some examples, the respective sets of parity bits for the protocol unit may be compared to parity bits generated for the corresponding data in the data storage unit to identify potential errors in the protocol unit or the data storage unit. In some examples, a data storage unit may include at least portions (e.g., information from data fields) of more than one protocol unit (e.g., a plurality of protocol units), however in some examples a data storage unit may include data from one protocol unit.

Before the data storage unit is written to a memory array 345, the data storage unit may be communicated from the DTM 330 to a buffer 335 and then to the encoder/decoder 340. For example, the DTM 330 may break the data storage unit into one or more data words. As used herein, a data word may correspond to a size of data that is smaller than the data storage unit. Additionally or alternatively, each data word may be a same or a different size than a protocol unit. The respective data words may be transmitted by the DTM 330 to the buffer 335. When a data word is received by the buffer 335, the buffer 335 may generate at least one bit (e.g., for each data cycle) to determine whether an error occurred between the DTM 330 and the buffer 335 (e.g., when the data word was transmitted on a bus between the DTM 330 and the buffer 335). The encoder/decoder 340 may read the codewords from the buffer 335. When the encoder/decoder 340 receives a data word, the encoder/decoder 340 may generate at least one bit to determine whether an error occurred between the buffer 335 and the encoder/decoder 340 (e.g., when the data word was transmitted on a communication channel between the buffer 335 and the encoder/decoder 340). If no errors are detected, the encoder/decoder 340 may encode the data words according to a first error protection scheme to create codewords (e.g., first codewords) from each data word and may store the respective codewords to the memory array 345. For example, each codeword may include systematic bits and parity bits generated according to the first error protection scheme. During a write operation, the data storage unit may be encoded, which may add error correction capabilities to the data storage unit before being written to the memory array 345.

In some cases, upon generating the data storage unit, the DTM 330 may generate a check code (e.g., an E2E CRC) using the data storage unit. For example, the check code may be generated using the data included in the data storage unit, which may correspond to the data block (e.g., data corresponding to a block of LBAs that are accessed as part of an access operation according to the protocol used by the protocol controller 325) received from the host system 305. As described herein, the check code may allow for the identification of errors in the data that occurred while the data is within the memory system 310. Before the data storage unit is written to a memory array 345, the data storage unit may be communicated from the DTM 330 to a buffer 335 and then to the encoder/decoder 340.

Additionally, or alternatively, the protocol controller 325 may communicate a protocol unit associated with control information to the command controller 355. As used herein, the term control information may refer to any information associated with a command received from the host system 305 other than data to be read from or written to a memory array 345. In some examples, the protocol unit comprising the control information may be processed by the command controller 355 and may be communicated to a system bus 350. The system bus 350 may communicate the control information to a portion or component of the memory system 310 associated with the control information. The system bus 350 may be an example of the bus 235 of FIG. 2.

As described herein, the components of the memory system 310 may be configured to perform error detection operations to identify errors that occur in various data paths. For example, the interface controller 315 may receive data units from the host system 305 that include respective sets of parity bits (e.g., third sets of parity bits). The parity bits may have been generated using a CRC error-detecting code. The interface controller 315 may, upon receiving the data units and parity bits, generate additional sets of parity bits (e.g., fourth sets of parity bits) for comparison with the third sets of parity bits. Further, the interface controller 315 may generate one or more protocol units using data from the data units. The interface controller 315 may compare the respective sets of parity bits for the data units to parity bits generated for the corresponding data from the protocol units. Generating sets of parity bits for data in the protocol units to compare with parity bits received in data units from the host system 305 may ultimately allow the memory system 310 to identify whether errors occur between the host system 305 and the memory system 310, as well as internally within the memory system 310. Identifying errors that occur internally (e.g., within the data paths of the memory system 310), may improve the overall performance and reliability of the memory system 310.

In some cases, the host system 305 may transmit one or more data units to the memory system 310 that are associated with one or more write commands. The host system 305 may transmit one or more data units associated with the write command and one or more data units associated with corresponding data. In some examples, the host system 305 may transmit data packets associated with the write command to the memory system 310. In some cases, each data unit may include a respective set of fields and a respective third set of parity bits associated with the respective set of fields. In some examples, the respective third set of parity bits may have been generated using a CRC error-detection code.

The interface controller 315 may generate, from the data units, one or more protocol units. The interface controller 315 may compare the respective sets of parity bits (e.g., the respective third sets of parity bits) for the data units to parity bits generated for the corresponding data from the protocol units. In some cases, each protocol unit may be associated with writing data to a subset of contiguous LBAs in the range of LBAs. For example, the write command may be associated with a first protocol unit associated with writing data to a first subset of LBAs and a second data unit associated with writing data to a second subset of LBAs in the range of LBAs. In some implementations, the first subset of LBAs may be contiguous with the second subset of LBAs.

The memory system 310 may transmit data requests (e.g., request to transfer (RTT) commands) to the host system 305 in response to receiving the write command and prior to receiving the one or more protocol units. For example, the host system 305 may transmit the write command indicating a range of LBAs and the interface controller 315 may send multiple RTT commands (e.g., where each RTT command may be included in a protocol unit generated by the protocol controller 325 and transferred to the host system 305 via one or more data units) to the host system 305 in response to receiving the write command, where each RTT command may request data for a set of LBAs (e.g., multiple RTT commands may be used to request data for the range of LBAs in the write command) In some examples, each RTT command may correspond to requesting a protocol unit from the host system 305, where the protocol unit is associated with a set of LBAs and is transferred from the host system 305 in one or more data units. For example, the memory system 310 may transmit an RTT command indicating to transmit the first protocol unit associated with a first set of LBAs of the range of LBAs. Accordingly, the host system 305 may transmit the first protocol unit for the first set of LBAs in one or more data units in response to receiving the RTT for the first protocol unit.

For example, the host system 305 may transmit a write command associated with a range of LBAs 0-100 in a data block. The memory system 310 may transmit an RTT command to the host system 305 for the first UPIU, wherein the first UPIU may be associated with LBAs 0-10. The host system 305 may transmit a first data unit associated with LBAs 0-5 and a second data unit associated with LBAs 6-10. The memory system 310 may transmit subsequent RTT commands to the host system 305 for the rest of the LBAs in the range, wherein each RTT command corresponds to 10 LBAs. For example, the host system 305 may transmit 10 UPIUs in response. If the memory system 310 detects an error in data included in a data storage unit that was created using a second UPIU (e.g., LBAs 10-20), the memory system 310 may transmit an RTT for the LBAs in the second UPIU. Thus, the interface controller may transmit an RTT with an offset of 10 LBAs. Subsequently, the host system 305 may transmit the data units corresponding to the LBAs of the second UPIU. Upon receiving the data units, the interface controller 315 may generate one or more protocol units (e.g., a UPIU) using the one or more data units. For example, a first protocol unit may include the first data unit and the second data unit. The interface controller 315 may additionally perform an error detection operation. In some examples, the respective sets of parity bits for the data units may be compared to parity bits generated for the corresponding data in the protocol unit to identify potential errors in the data units or the protocol unit. In other cases, the interface controller 315 may generate a fourth set of parity bits using each data unit included in the write command. The generated check bits may then be compared with respective third sets of parity bits associated with data units from the write command. In some cases, if the compared bits do not match, then an error may have occurred (e.g., the data associated with the write command may include an error), and the memory system 310 may transmit additional data requests to the host system 305. For example, upon determining an error in the data units or the protocol units, the memory system 310 may retransmit the RTT command to the host system 305 for the first data unit. The RTT command may include an indication of the LBA (or a range of LBAs) associated with the data unit or the protocol unit associated with the error. For example, the RTT command may request data other than data associated with a first LBA of the write command. In such instances, the RTT may include an indicator (e.g., an offset indicator), which may allow the host system 305 to transmit (e.g., retransmit) data associated with the particular LBA (or LBAs). The host system 305 may transmit corresponding data units based on receiving the RTT command with an offset indicator specifying to retransmit a protocol unit including data for the subset of LBAs.

To generate the one or more protocol units, the interface controller 315 may selectively remove some data (e.g., some fields) from the one or more data units corresponding to each protocol unit. For example, for a first protocol unit, the interface controller 315 may remove data from the first data unit and the second data unit. For example, some fields that do not include payload data or identify a destination location for the data may not be included in the first protocol unit (such as the first and second sets of parity bits). Additionally, or alternatively, the interface controller 315 may generate a respective set of parity bits (e.g., a first set of parity bits) for each protocol unit. In some examples, the interface controller 315 may compare the respective sets of parity bits for the data units to parity bits generated for the corresponding data from the protocol units to identify potential errors. That is, the interface controller may compare the respective sets of parity bits for the data units to parity bits generated for the corresponding data in the protocol units after generation of the protocol units. As described herein, the first set of parity bits may be used for identifying errors in one or more data paths of the memory system 310.

Upon generating the one or more protocol units, the interface controller 315 may transmit the one or more protocol units to the link controller 320, and the link controller 320 may transmit the one or more protocol units to the protocol controller 325. As described herein, the protocol controller 325 may determine that one or more protocol units of the one or more protocol units is associated with data to be written to a memory array 345, and may transmit the one or more protocol units to the DTM 330.

Upon receiving the one or more protocol units, the DTM 330 may perform an error detection operation or generate a data storage unit and perform a second error detection operation. For example, the DTM 330 may generate a data storage unit including data from one or more protocol units. The DTM 330 may then generate respective second sets of parity bits from respective data in the data storage unit corresponding to the received protocol units. The second set of parity bits may then be compared with the first set of parity bits received in each protocol unit. If the compared bits do not match, then an error may have occurred in a data path between the interface controller 315 and the DTM 330, or in the DTM. In such instances, the DTM 330 may communicate with the interface controller 315 to indicate the subset of LBAs associated with the error within the corresponding protocol unit. The memory system 310 may transmit an RTT command to the host system 305 to request data (e.g., one or more protocol units). For example, the DTM 330 may identify an error in a first protocol unit, where the first protocol unit. In another example, the DTM 330 may identify the error in the data in the data storage unit that corresponds to the first protocol unit. The interface controller 315 may send one or more RTT commands to the host system 305 to request data associated with the protocol unit. The protocol controller 325 may generate the one or more RTT commands indicating an offset within the range of LBAs of the write command associated with the first protocol unit. The interface controller 315 may transmit the one or more RTT commands to the host system 305 via one or more data units, and the interface controller 315 may receive one or more data units corresponding to the retransmitted first protocol unit. The interface controller 315 may then regenerate the first protocol unit using the one or more data units received for the first protocol unit.

The DTM 330 may process one or more protocol units to obtain a data storage unit. To generate the data storage unit, the DTM 330 may selectively remove some data (e.g., some fields) from each protocol unit. For example, some fields that do not include payload data or identify a destination location for the data may not be included in the data storage unit (such as the sets of parity bits). For example, the data storage unit may include data from the first protocol unit and a second protocol unit. In some examples, the DTM 330 may also generate a set of parity bits (e.g., a fifth set of parity bits) for the data storage unit. The fifth set of parity bits for the data storage unit, which may be referred to as end-to-end CRC bits, may be stored to a portion of a memory array 345 and may be used as part of an error detection operation when reading the associated data from the memory array 345.

After generating the data storage unit, the DTM 330 may break the data storage unit into one or more data words. The respective data words may be transmitted by the DTM 330 to the buffer 335. When a data word is received by the buffer 335, the buffer 335 may generate at least one bit (e.g., for each data cycle) to determine whether an error occurred between the DTM 330 and the buffer 335 (e.g., when the data word was transmitted on a bus between the DTM 330 and the buffer 335). The encoder/decoder 340 may read the codewords from the buffer 335. When the encoder/decoder 340 receives a data word, the encoder/decoder 340 may generate at least one bit to determine whether an error occurred between the buffer 335 and the encoder/decoder 340 (e.g., when the data word was transmitted on a communication channel between the buffer 335 and the encoder/decoder 340). If no errors are detected, the encoder/decoder 340 may encode the data words according to a first error protection scheme to create codewords (e.g., first codewords) from each data word and may store the respective codewords to the memory array 345.

In other examples, commands received by the interface controller 315 that include control information may be processed similarly. However, instead of transmitting one or more protocol units to the DTM 330, the protocol controller 325 may process the one or more protocol units. For example, the protocol controller 325 may process the one or more protocol units and transmit the resulting command to the command controller 355 via the system bus 350. The command controller 355 (e.g., the storage controller 230) may determine how to perform operations using the buffer 335, encoder/decoder 340, and memory array 345 in order to store the associated data to the memory array 345.

In some examples, the host system 305 may transmit one or more read commands to the memory system 310. For example, the host system 305 may transmit a first read command, for data stored to a memory array 345 of the memory system 310. Upon receiving the first read command, the DTM 330 may read an associated data storage unit from the memory array 345. The data storage unit may include first data and a first set of parity bits associated with the first data. In some examples, the data storage unit may first be decoded by the encoder/decoder 340 (e.g., in one or more data words) and may be communicated to the DTM 330 via the buffer 335.

Upon receiving the data storage unit, the DTM 330 may perform an error detection operation. For example, the DTM 330 may generate a set of parity bits (e.g., a sixth set of parity bits) for the data storage unit. The sixth set of parity bits may then be compared with the fifth set of parity bits included in the data storage unit. If the compared bits do not match, then an error may have occurred when reading the data from the memory array 345 (or when the data was written to the memory array 345). In such instances, the DTM 330 may reread the data storage unit from the associated memory array 345 and compare (e.g., re-compare) the respective sets of parity bits. The DTM 330 may process the data storage unit to obtain one or more protocol units (e.g., a first protocol unit and a second protocol unit). To generate the one or more protocol units, the DTM 330 may selectively separate the data in the data storage unit into different protocol units and may add one or more fields to each respective protocol unit. For example, the DTM 330 may separate the data storage unit into the first protocol and the second protocol unit. In some examples, the one or more protocol units in the data storage unit may each include the respective first sets of parity bits. In some examples, the respective sets of parity bits for the data storage unit may be compared to parity bits for corresponding data in the protocol units to identify potential errors in the data storage unit or the protocol units (e.g., the parity bits in the data storage unit may be checked against the data in the protocol units after generation of the protocol units and parity information in the protocol units).

After generating the one or more protocol units, the DTM 330 may transmit the one or more protocol units to the interface controller 315 (e.g., via the protocol controller 325 and the link controller 320). The protocol controller 325 may add a respective offset to the protocol unit, indicating an address range within a range of LBAs associated with the read command Upon receiving the one or more protocol units, the interface controller 315 may generate one or more data units. In some examples, respective sets of parity bits for the protocol units may be compared to parity bits for corresponding data in the data units to identify potential errors in the protocol units or the data units. In other examples, the interface controller may perform an error detection operation on the parity bits of the protocol units. For example, the interface controller 315 may generate the second set of parity bits for each protocol unit of the one or more protocol units. The second set of parity bits may then be compared with the first set of parity bits. If the compared bits do not match, then an error may have occurred in a data path of the memory system 310 (e.g., between the DTM 330 and the interface controller 315). The data may be communicated to the host system 305 regardless of detecting an error. In some examples, the interface controller 315 may determine an error in the data units or the protocol units and the interface controller 315 or the DTM 330 may regenerate the data units or the protocol units, respectively.

In some instances, upon an error being detected in the data units or protocol units associated with the data for the read command, the interface controller 315 may transmit signaling to the DTM 330 to regenerate the one or more protocol units that include the error. In some cases, the DTM 330 may regenerate the one or more protocol units from the data storage unit (e.g., again checking the parity bits in the data storage unit with parity bits generated for corresponding data in the protocol units). Alternatively, the DTM 330 may reread the data storage unit from the associated memory array 345 and regenerate the one or more protocol units that includes the error. The interface controller 315 may process the one or more protocol units to generate one or more data units and may transmit the one or more data units to the host system 305.

To generate the one or more data units, the interface controller 315 may selectively separate each protocol unit into different data units and may add one or more fields to each respective data unit. For example, the interface controller 315 may separate the first protocol unit into the first data unit and the second data unit. In some examples, the one or more data units in each protocol unit may include respective sets of parity bits. After generating the one or more data units, the interface controller 315 may transmit the one or more data units to the host system 305.

Accordingly, using parity bits (and performing error detection operations) associated with the data units, the UPIU, and the data storage unit, the memory system 310 may detect errors that occur along the data path of the memory system 310. The memory system 310 may communicate with the host system 305 (e.g., for the write operation) or utilize one or more internal components (e.g., for the read operation) to obtain valid data (e.g., data units, UPIU, data storage unit), which may improve the overall performance and reliability of the memory system 310.

Figure 4:
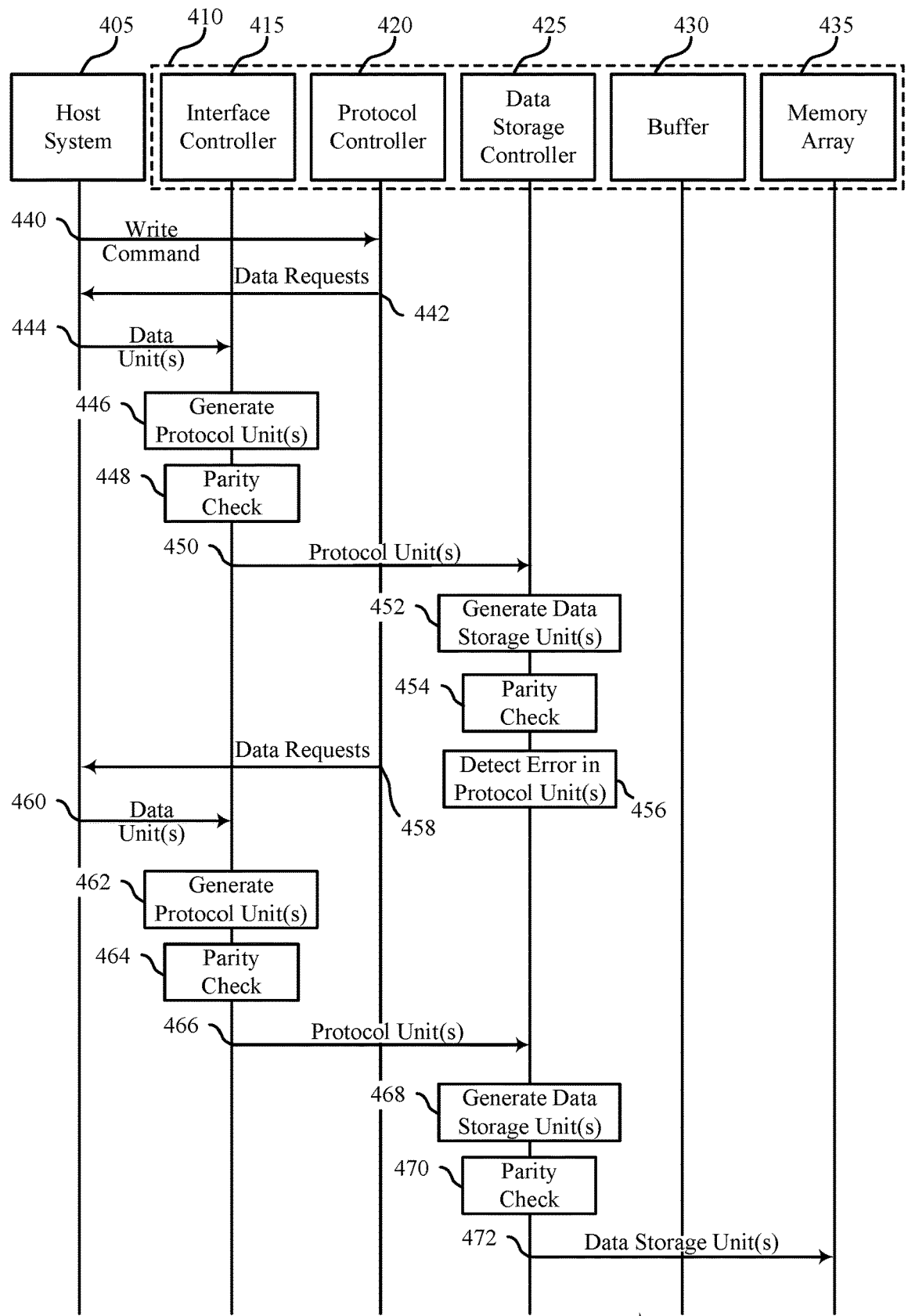
FIG. 4 illustrates an example of a process flow diagram that supports data recovery using ordered data requests in accordance with examples as disclosed herein.

FIG. 4 illustrates an example of a process flow diagram 400 that supports data recovery using ordered data requests in accordance with examples as disclosed herein. In some examples, the process flow diagram 400 may illustrate a write operation performed at a memory system 410. The memory system 410 may be coupled with a host system 405 and may include an interface controller 415, a protocol controller 420, a data storage controller 425, a buffer 430, and a memory array 435. In some examples, the interface controller 415, the protocol controller 420, the data storage controller 425, the buffer 430, and the memory array 435 may be examples of the interface controller 315, the protocol controller 325, the DTM 330, the buffer 335, and the memory array 345 as described with reference to FIG. 3. The memory system 410 may include other components, such as the components described with reference to FIG. 3, that are not shown. The process flow diagram 400 may illustrate the generation of data units, protocol units, and data storage units, and corresponding sets of parity bits, which may allow for the detection of errors in data paths of the memory system 410 and the retransmission of data associated with the errors to obtain valid data, which may improve the overall performance and reliability of the memory system 410.

At 440, the host system 405 may transmit a write command to the memory system 410, where the protocol controller 415 may receive the write command for the memory system 410. The write command may indicate a range of LBAs of the memory array 435. In some examples, the host system 405 may transmit data units associated with the write command to the memory system 410.

At 442, the memory system 410 may transmit one or more data requests (e.g., RTT commands) to the host system 405 based on receiving the write command. In some cases, each RTT command may correspond to requesting a respective protocol unit from the host system 405, where each protocol unit may correspond to a set of contiguous LBAs of the range of LBAs of the memory array 445. For example, the host system 405 may transmit the write command indicating a range of LBAs and the memory system 410 may send one or more RTT commands to the host system 405 in response to receiving the write command, where each RTT command may request data for a set of LBAs (e.g., one or more RTT commands may be used to request data for the range of LBAs in the write command) For example, the memory system 410 may transmit an RTT command indicating to transmit a first protocol unit (e.g., a protocol unit corresponding to a set of LBAs within the range of LBAs according to an offset). The memory system may transmit the first protocol unit using one or more data units.

At 444, the host system 405 may transmit one or more data units to the interface controller 415, where the one or more data units are associated with an RTT command for the corresponding protocol unit, transmitted to the host system 405 at 442. In some examples, the quantity of data units may correspond to a quantity of RTT commands transmitted to the host system 405. For example, the host system 405 may transmit the first data unit and a second data unit in response to receiving the RTT command for the first protocol unit. In some cases, each data unit includes a respective set of fields and a respective set of parity bits (e.g., a third set of parity bits) associated with the respective set of fields. In some examples, the respective third set of parity bits may have been generated using a CRC error-detection code.

At 446, the interface controller 415 may generate the one or more protocol units using the one or more data units received from the host system 405 at 444. Each protocol unit may be associated with a set of LBAs, where the set of LBAs may include one or more subsets of LBAs associated with one or more data units. For example, a first protocol unit may include data from the first data unit and a second data unit and may correspond to a first set of LBAs. In some examples, to generate the one or more protocol units, the interface controller 415 may selectively remove some data (e.g., some fields) from the one or more data units corresponding to each protocol unit. For example, for a first protocol unit, the interface controller 415 may remove data from the first data unit and the second data unit. Additionally, or alternatively, the interface controller 415 may generate a respective first set of parity bits for each protocol unit. For example, the interface controller 415 may generate a first set of parity bits for the first protocol unit. As described herein, the first set of parity bits may be used for identifying errors in data paths of the memory system 410.

At 448, the interface controller 415 may perform an error detection operation (e.g., a parity check) on the one or more data units based on receiving the one or more data units and generating the one or more protocol units. In some examples, the interface controller 415 may compare the respective sets of parity bits of the data units to parity bits generated from corresponding data in the one or more protocol units to identify one or more errors in the data units or the protocol units. In other examples, the interface controller 415 may generate a set of parity bits (e.g., a fourth set of parity bits) for each data unit transmitted from the host system 405. The fourth set of parity bits may then be compared with the third set of parity bits received in the respective data units from the host system 405. In some cases, if an error is detected, then an error may have occurred along the data path between the host system 405 and the interface controller 415, and during generating the protocol units at the interface controller 415, and the process flow may continue to step 458, where the memory system 410 may retransmit one or more RTT commands to the host system 405. In other cases, if the compared bits match, the process flow may continue to step 450, where the interface controller 415 may transmit the one or more protocol units (e.g., a UPIU) to the data storage controller 425.

At 450, the interface controller 415 may transmit the one or more protocol units to the data storage controller 425. In some cases, the data storage controller 425 may be an example of a DTM 330, as described with reference to FIG. 3. In some cases, the interface controller 415 may transmit the one or more protocol units to a link controller (e.g., not shown) and the link controller may transmit the one or more protocol units to the protocol controller 420. In such cases, the protocol controller may perform operations on the one or more protocol units prior to transmitting the one or more protocol units to the data storage controller 425.

At 452, the data storage controller 425 may generate a data storage unit using the one or more protocol units received from the interface controller 415. The data storage unit may be associated with the range of LBAs (e.g., indicated by the write command), where the range of LBAs may include one or more sets of LBAs associated with one or more protocol units. For example, the data storage unit may include data from the first protocol unit and a second protocol unit, where the first protocol unit includes data from the first data unit and the second data unit, and the second protocol unit includes data from the third data unit and the fourth data unit. The data storage unit may correspond to a range of logical addresses including the first set of LBAs associated with the first protocol unit and a second set of LBAs associated with the second protocol unit, where the second set of LBAs includes a third subset of LBAs associated with the third data unit and a fourth subset of LBAs associated with the fourth data unit. To generate the data storage unit, the data storage controller 425 may selectively remove some data (e.g., some fields) from each protocol unit and combine one or more of the one or more protocol units. In some examples, the data storage controller 425 may also generate a set of parity bits (e.g., a fifth set of parity bits) for the data storage unit.

At 454, the data storage controller 425 may perform an error detection operation (e.g., a parity check) on the one or more protocol units based on receiving the one or more protocol units and generating the data storage unit. In some examples, the data storage controller 425 may compare the respective sets of parity bits of the protocol units to parity bits generated from corresponding data in the data storage unit to identify one or more errors in the protocol units or the data storage unit. In other examples, the data storage controller 425 may generate a set of parity bits (e.g., a second set of parity bits) for each protocol unit generated by the interface controller 415. The second set of parity bits may then be compared with the first set of parity bits received from the interface controller 415 in the respective protocol units. In some cases, if one or more errors is detected, the process flow may continue to step 454, where the data storage controller 425 may detect an error in one or more of the protocol units. In other cases, the process flow may continue to step 472, where the data storage controller 425 may transmit the data storage unit to the memory array 435.

At 456, the data storage controller 425 may determine one or more errors have occurred in the data path between the interface controller 415 and the data storage controller 425. The one or more errors may be associated with the or more protocol units. In some instances, the one or more errors may be associated with the data units or the data storage unit. In some cases, the one or more errors may indicate that the data path between the host system 405 and the data storage controller 425 contributed to the one or more errors.

At 458, the interface controller 415 may retransmit one or more data requests (e.g., RTT commands) to the host system 405. The interface controller 415 may retransmit the one or more RTT commands to the host system 405 based on determining an error in the data units or the protocol units (e.g., by comparing the parity bits and detecting a mismatch). Each RTT command may indicate the host system 405 to retransmit the data units corresponding to the protocol units associated with each RTT command. In some cases, if an error is detected at the one or more protocol units, the interface controller 415 may transmit one or more RTT commands corresponding to the one or more data units in the one or more protocol units. In some examples, the RTT commands may include an indication of an offset (e.g., LBA offset) associated with each protocol unit, such that each RTT command unit may select data units associated with a respective protocol unit. For example, the data storage controller 425 may detect an error in a second protocol unit, and the interface controller 415 may retransmit an RTT command for the second protocol unit.

At 460, the host system 405 may retransmit one or more data units to the interface controller 415 based on receiving the one or more RTT commands. In some cases, the host system 405 may retransmit the respective sets of parity bits for the one or more data units indicated by the respective RTT commands.

At 462, the interface controller 415 may generate the one or more protocol units using the one or more data units received from the host system 405 at 460. The operations performed at 462 may be similar to the operations performed at 446.

At 464, the interface controller 415 may perform an error detection operation (e.g., a parity check) on the one or more data units based on receiving the one or more data units and generating the one or more protocol units. For example, the interface controller 415 may compare the respective sets of parity bits of the data units to data (e.g., respective sets of parity bits) in the one or more protocol units to identify one or more errors in the data units or the protocol units. The operations performed at 460 may be similar to the operations performed at 448.

At 466, the interface controller 415 may transmit the one or more protocol units to the data storage controller 425. The operations performed at 464 may be similar to the operations performed at 450.

At 468, the data storage controller 425 may generate a data storage unit using the one or more protocol units received from the interface controller 415 at 466. The operations performed at 468 may be similar to the operations performed at 452.

At 470, the data storage controller 425 may perform an error detection operation (e.g., a parity check) on the one or more protocol units based on receiving the one or more protocol units and generating the data storage unit. For example, the data storage controller 425 may compare the respective sets of parity bits of the protocol units to parity bits generated for the corresponding data in the data storage unit to identify one or more errors in the protocol units or the data storage unit. The operations performed at 470 may be similar to the operations performed at 454.

At 472, the data storage controller 425 may transfer the data storage unit and the respective set of parity bits to the memory array 435. In some cases, the data storage controller 425 may break the data storage unit into one or more data words. The respective data words may be transmitted by the data storage controller 425 to a buffer. When a data word is received by the buffer, the buffer may generate at least one bit (e.g., for each data cycle) to determine whether an error occurred between the data storage controller 425 and the buffer (e.g., when the data word was transmitted on a bus between the data storage controller 425 and the buffer). An encoder/decoder may read the codewords from the buffer. When the encoder/decoder receives a data word, the encoder/decoder may generate at least one bit to determine whether an error occurred between the buffer and the encoder/decoder (e.g., when the data word was transmitted on a communication channel between the buffer and the encoder/decoder). If no errors are detected, the encoder/decoder may encode the data words according to a first error protection scheme to create codewords (e.g., first codewords) from each data word and may store the respective codewords to the memory array 435. In some examples, the data words may be encoded (e.g., before being written to a memory array 345) for error correction purposes. After encoding, the data words may be written to the memory array 435.

In some cases, the memory system 410 may transmit a response message to the host system 405 indicating the write command was successful. The memory system 410 may transmit the response message based on writing the data storage unit to the memory array 435.

Accordingly as described in the method herein, using parity bits (and performing error detection operations) associated with the data units, the UPIU, and the data storage unit, the memory system 410 may detect errors that occur along the data path of the memory system 410. In such instances, the memory system 410 may transmit RTT commands to the host system 405 to obtain valid data, (e.g., data units, UPIU, data storage unit), which may improve the overall performance and reliability of the memory system 210.

Figure 5:
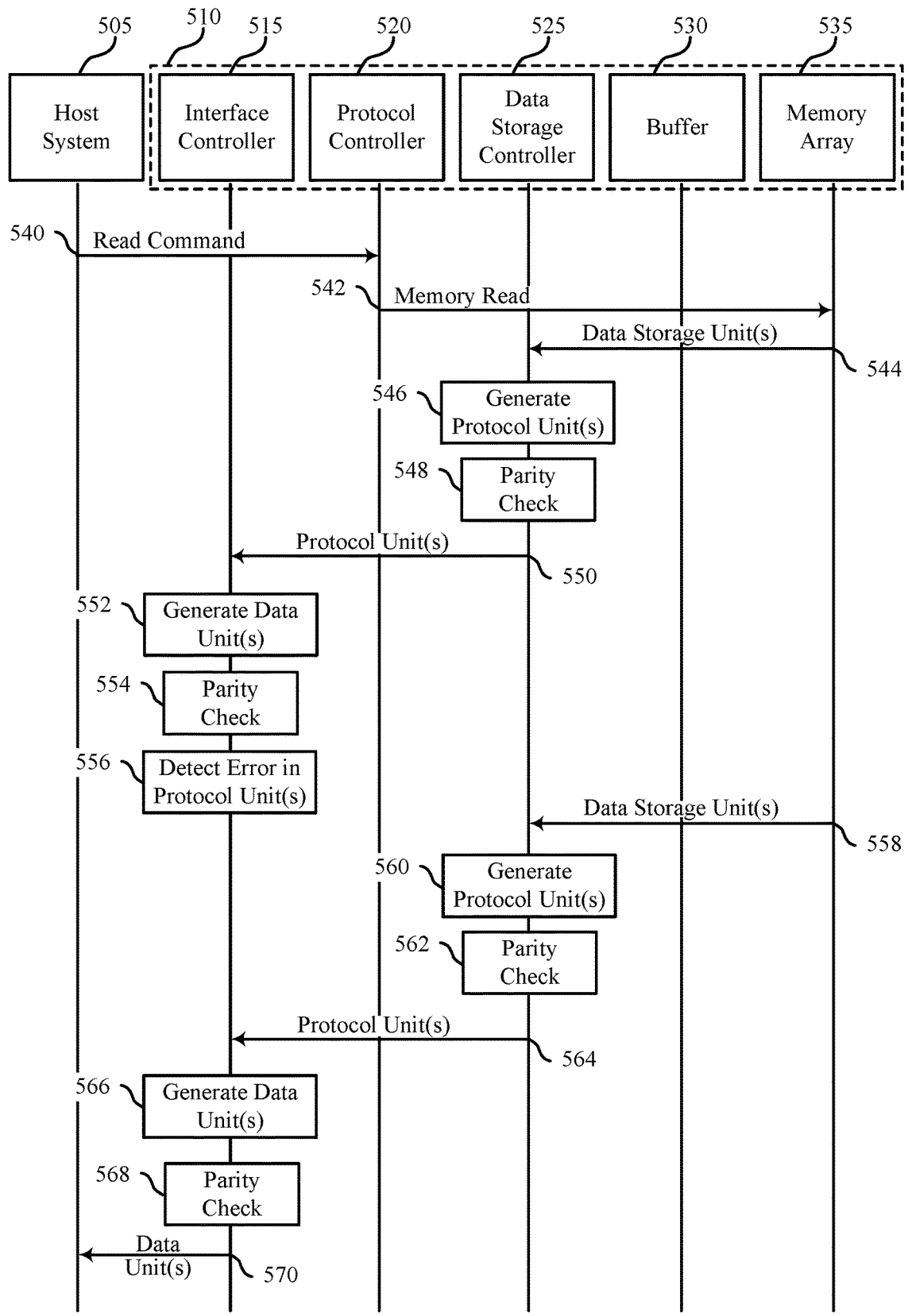
FIG. 5 illustrates an example of a process flow diagram that supports data recovery using ordered data requests in accordance with examples as disclosed herein.

FIG. 5 illustrates an example of a process flow diagram 500 that supports data recovery using ordered data requests in accordance with examples as disclosed herein. In some examples, the process flow diagram 500 may illustrate a write operation performed at a memory system 510. The memory system 510 may be coupled with a host system 505 and may include an interface controller 515, a protocol controller 520, a data storage controller 525, a buffer 530, and a memory array 535. In some examples, the interface controller 515, the protocol controller 520, the data storage controller 525, the buffer 530, and the memory array 535 may be examples of the interface controller 315, the protocol controller 325, the DTM 330, the buffer 335, and the memory array 345 as described with reference to FIG. 3. The memory system 510 may include other components, such as the components described with reference to FIG. 3, that are not shown. The process flow diagram 500 may illustrate the generation of data units, protocol units, and data storage units, and corresponding sets of parity bits which may allow for the detection of errors in data paths of the memory system 510 and the rereading of data associated with the errors to obtain valid data, which may improve the overall performance and reliability of the memory system 510.

At 540, the host system 505 may transmit a read command to the memory system 510, where the protocol controller 520 may receive the read command for the memory system 510. The read command may indicate a range of logical addresses of the memory array 535 to be read by the host system 505.

At 542, the memory system 510 may read the data indicated in the read command from the memory array 535.

Specifically, the protocol controller 520 may pass the read command to a memory controller (e.g., command controller 355, memory system controller 215), which may instruct the memory array 535 (e.g., via a encoder/decoder 340) to output data of physical addresses of the memory array 535 corresponding to the range of logical addresses indicated by the read command.

At 544, the data storage controller 525 may receive one or more data words from the memory array 535. The data storage controller 525 may assemble a data storage unit from the one or more data words read from the memory array 535. In some cases, the data storage unit may correspond to the range of logical addresses indicated by the read command. In some cases, the range of LBAs may include one or more sets of LBAs associated with one or more protocol units. The data storage unit may include a set of parity bits (e.g., a fifth set of parity bits) from when it was written to the memory array 535 prior to reading. In some examples, the data storage unit may first be decoded by an encoder/decoder block (e.g., not shown) and may be communicated to the data storage controller 525 via the buffer 530.

At 546, the data storage controller 525 may process the data storage unit to generate one or more protocol units (e.g., a first protocol unit and a second protocol unit). Each protocol unit may be associated with a set of LBAs, where the set of LBAs may include one or more subsets of LBAs associated with one or more data units. For example, the first protocol unit may correspond to a first set of LBAs. In some cases, to generate the one or more protocol units, the data storage controller 525 may selectively separate each data storage unit into multiple protocol units and may add one or more fields to each respective protocol unit. For example, the data storage controller 525 may separate the data storage unit into a first protocol unit and a second protocol unit and add a first field to the first protocol unit and a second field to the second protocol unit. In some examples, the one or more protocol units in the data storage unit may each include respective sets of parity bits (e.g., first sets of parity bits). For example, the first protocol unit and the second protocol unit may each include respective first sets of parity bits.

At 548, the data storage controller 525 may perform an error detection operation (e.g., a parity check). In some examples, the data storage controller 525 may perform the error operation on the data storage unit based on reading the data storage unit from the memory array 535. In some other examples, the data storage controller 525 may compare the respective set of parity bits for the data storage unit with parity bits generated from corresponding data from the protocol units generated from the data storage unit to identify an error in the data storage unit or the protocol units. In some instances, the data storage controller 525 may generate a set of parity bits (e.g., a sixth set of parity bits) for the data storage unit. The sixth set of parity bits may then be compared with the fifth set of parity bits received during reading the data storage unit from the memory array 535. In some cases, if the compared bits do not match, then an error may have occurred. If an error is detected, the process flow may continue to step 558, where the data storage controller 525 may reread the data storage unit from the memory array 535. In other cases, the process flow may continue to step 550, where the data storage controller 525 may transmit the one or more protocol units to the interface controller 515.

In some cases, the data storage controller 525 may transmit the one or more protocol units to the protocol controller 520 and the protocol controller may transmit the one or more protocol units to a link controller (e.g., not shown). In some cases, the protocol controller may perform operations on the one or more protocol units prior to transmitting the one or more protocol units to the link controller. In such cases, the link controller may transmit the one or more protocol units to the interface controller 515. In some cases, the data storage controller 525 may transmit the respective sets of parity bits of the one or more protocol units to the interface controller 515 (e.g., along the same data path).

At 552, the interface controller 515 may generate one or more data units using the one or more protocol units. To generate the one or more data units, the interface controller 515 may selectively separate each protocol unit into different data units and may add one or more fields to each respective data unit. For example, the interface controller 515 may separate the first protocol unit into the first data unit and the second data unit and add a first field to the first data unit and a second field to the second data unit. In some examples, the one or more data units in each protocol unit may include respective sets of parity bits (e.g., third sets of parity bits). For example, the first data unit and the second data unit may each include respective third sets of parity bits.

At 554, the interface controller 515 may perform an error detection operation (e.g., a parity check), based on receiving the protocol units and generating the data units. For example, the interface controller 515 may generate a set of parity bits (e.g., a second set of parity bits) for each protocol unit of the one or more protocol units. The second set of parity bits may then be compared with the first set of parity bits from the data storage controller 525. In some other examples, the interface controller 515 may compare the respective set of parity bits for the protocol units with parity bits generated from corresponding data from the data units to identify an error in the protocol units or the data units. In some cases, if an error is detected, the process flow may continue to step 556, where the interface controller 515 may determine an error has occurred in the one or more protocol units. In other cases, the process flow may continue to step 570, where the interface controller 515 may transmit the data units to the host system 505.

At 556, the interface controller 515 may determine one or more errors have occurred in the data path between the interface controller 515 and the data storage controller 525. The one or more errors may be associated with the or more protocol units. In some examples, the one or more errors may be associated with data units. In some cases, the one or more errors may indicate that the data path between the memory array 535 and the data storage controller 525 contributed to the one or more errors.

At 560, the data storage controller 525 may regenerate the one or more protocol units. For example, the data storage controller 525 may, if the parity bits of the data storage unit match parity bits generated from the data of the data storage unit, regenerate the one or more protocol units from the data storage unit and recheck the parity bits of the data storage unit with parity bits generated from the corresponding data in the regenerated protocol units.

Alternatively, the data storage controller 525 may reread the data storage unit from the memory array 535 at 558. For example, the data storage controller 525 may reread the data storage unit based on determining that the error occurred in reading the data storage unit (e.g., based on a mismatch in parity information of the data storage unit against parity information generated from the data in the data storage unit). In some cases, the data storage controller 525 may reread the set of parity bits of the data storage unit. In some examples, the data storage unit may first be decoded by an encoder/decoder block (e.g., not shown) and may be communicated to the data storage controller 525 via the buffer 530. The data storage controller 525 may process the data storage unit to generate one or more protocol units (e.g., a first protocol unit and a second protocol unit). The operations performed at 560 may be similar to the operations performed at 548.

At 562, the data storage controller 525 may perform an error detection operation (e.g., a parity check) on the data storage unit based on rereading the data storage unit and generating the protocol units. For example, the data storage controller 425 may compare the respective sets of parity bits of the data storage unit to parity bits generated from corresponding data in the protocol units to identify one or more errors in the data storage unit or the protocol unit. The operations performed at 562 may be similar to the operations performed at 548.

At 564, the data storage controller 525 may retransmit the one or more protocol units to the interface controller 515. The operations performed at 562 may be similar to the operations performed at 550.

At 566, the interface controller 515 may generate one or more data units using the one or more protocol units. The operations performed at 566 may be similar to the operations performed at 552.

At 568, the interface controller 515 may perform an error detection operation (e.g., a parity check), based on receiving the protocol units and generating the data units. For example, the interface controller 515 may compare the respective sets of parity bits of the protocol units to parity bits generated from corresponding data in the data units to identify one or more errors in the protocol units or the data units. The operations performed at 564 may be similar to the operations performed at 554.

At 570, the interface controller 515 may transmit the one or more data units to the host system 505. In some cases, prior to transmitting the one or more data units to the host system 505, the interface controller 515 may determine an error associated with the one or more data units and instruct the respective controllers to regenerate the one or more data units. For example, the protocol controller 520 and data storage controller 525 may repeat the steps indicated at 558, 560, 562, 564, and 566 and confirm whether any additional errors occurred.

Accordingly as described in the method herein, using parity bits (and performing error detection operations) associated with the data units, the UPIU, and the data storage unit, the memory system 510 may detect errors that occur along the data path of the memory system 510. The memory system 510 may utilize one or more internal components (e.g., by rereading the data storage unit) to obtain valid data (e.g., data units, UPIU, data storage unit), which may improve the overall performance and reliability of the memory system 510.

Figure 6:
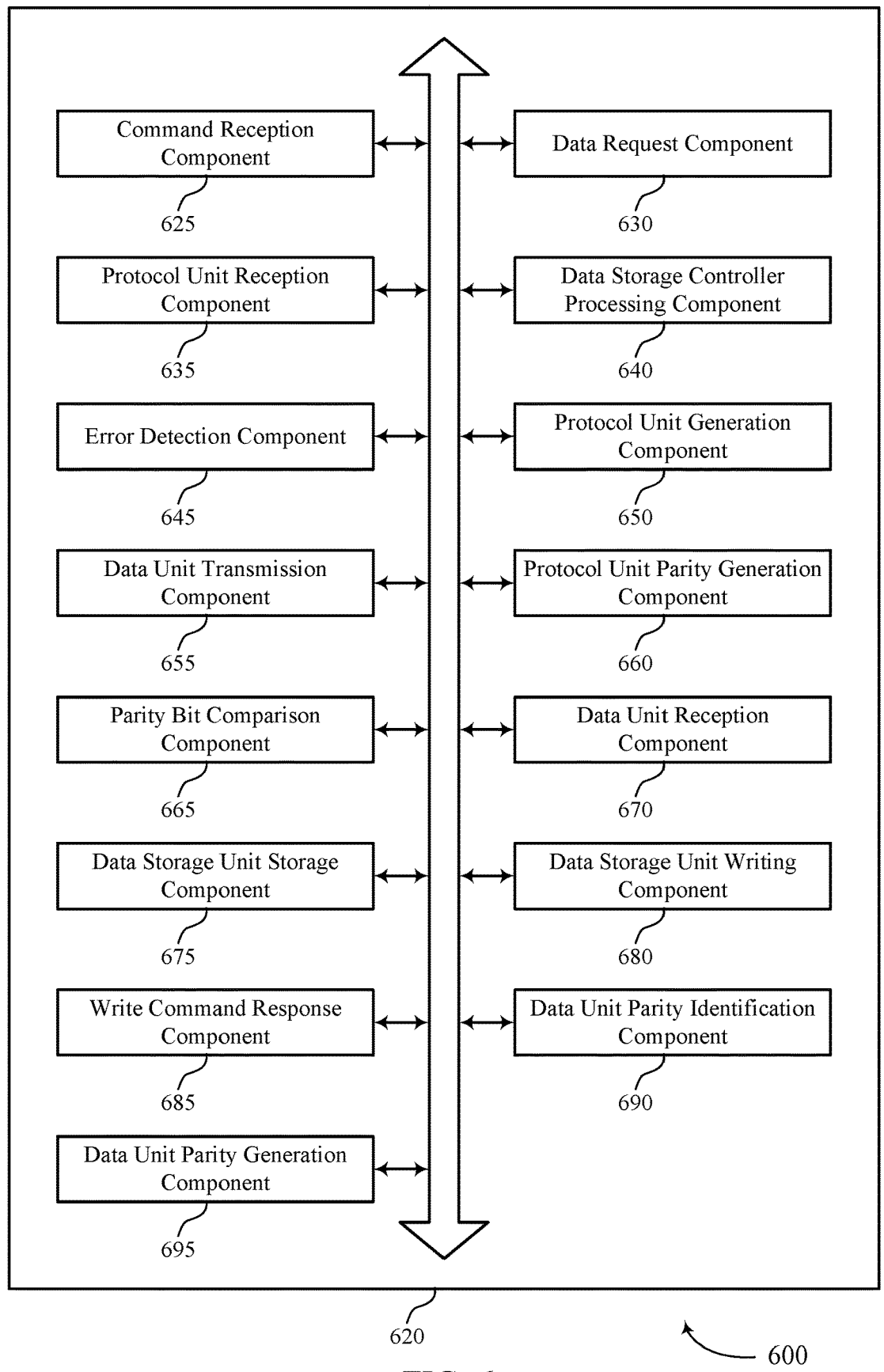
FIG. 6 shows a block diagram of a memory system that supports data recovery using ordered data requests in accordance with examples as disclosed herein.

FIG. 6 shows a block diagram 600 of a memory system 620 that supports data recovery using ordered data requests in accordance with examples as disclosed herein. The memory system 620 may be an example of aspects of a memory system as described with reference to FIGS. 1 through 5. The memory system 620, or various components thereof, may be an example of means for performing various aspects of data recovery using ordered data requests as described herein. For example, the memory system 620 may include a command reception component 625, a data request component 630, a protocol unit reception component 635, a data storage controller processing component 640, an error detection component 645, a protocol unit generation component 650, a data unit transmission component 655, a protocol unit parity generation component 660, a parity bit comparison component 665, a data unit reception component 670, a data storage unit storage component 675, a data storage unit writing component 680, a write command response component 685, a data unit parity identification component 690, a data unit parity generation component 695, or any combination thereof. Each of these components may communicate, directly or indirectly, with one another (e.g., via one or more buses).

The command reception component 625 may be configured as or otherwise support a means for receiving, at a memory system, a write command indicating a range of logical addresses of a memory array of the memory system. The data request component 630 may be configured as or otherwise support a means for transmitting a plurality of data requests each including an indicator of a respective subset of the range of logical addresses indicated in the write command. The protocol unit reception component 635 may be configured as or otherwise support a means for receiving a plurality of protocol units in response to the plurality of data requests, each of the plurality of protocol units corresponding to a data request and including data associated with the respective subset of the range of logical addresses of the corresponding data request. The data storage controller processing component 640 may be configured as or otherwise support a means for processing the plurality of protocol units to obtain at least one data storage unit corresponding to at least a subset of protocol units of the plurality of protocol units. The error detection component 645 may be configured as or otherwise support a means for determining, based at least in part on processing the plurality of protocol units, an error associated with one or more protocol units of the plurality of protocol units. In some examples, the data request component 630 may be configured as or otherwise support a means for retransmitting one or more data requests corresponding to the one or more protocol units associated with the error. In some examples, the protocol unit reception component 635 may be configured as or otherwise support a means for receiving retransmissions of the one or more protocol units associated with the error in response to the retransmission of the one or more data requests. In some examples, the data storage controller processing component 640 may be configured as or otherwise support a means for reprocessing the one or more protocol units to obtain the at least one data storage unit.

In some examples, to support determining the error, the protocol unit parity generation component 660 may be configured as or otherwise support a means for generating a plurality of second sets of parity bits associated with the plurality of protocol units, where each protocol unit has a respective set of second parity bits. In some examples, to support determining the error, the parity bit comparison component 665 may be configured as or otherwise support a means for comparing respective parity bits from the plurality of first sets of parity bits with respective parity bits from the plurality of second sets of parity bits. In some examples, to support determining the error, the parity bit comparison component 665 may be configured as or otherwise support a means for determining that one or more parity bits from the plurality of first sets of parity bits do not match corresponding parity bits from the plurality of second sets of parity bits, where determining the error associated with the one or more protocol units of the plurality of protocol units is based at least in part on determining that the one or more parity bits from the plurality of first sets of parity bits do not match the corresponding parity bits from the plurality of second sets of parity bits.

In some examples, to support receiving the plurality of protocol units, the data unit reception component 670 may be configured as or otherwise support a means for receiving a plurality of data units in response to the plurality of data requests, where one or more of the plurality of data units corresponds to a data request and includes data associated with the respective subset of the range of logical addresses of the corresponding data request.

In some examples, the data unit parity identification component 690 may be configured as or otherwise support a means for identifying a plurality of third sets of parity bits associated with the plurality of data units. In some examples, the data unit parity generation component 695 may be configured as or otherwise support a means for generating a plurality of fourth sets of parity bits associated with the plurality of data units. In some examples, the parity bit comparison component 665 may be configured as or otherwise support a means for comparing respective parity bits from the plurality of third sets of parity bits with respective parity bits from the plurality of fourth sets of parity bits. In some examples, the parity bit comparison component 665 may be configured as or otherwise support a means for determining that one or more parity bits from the plurality of third sets of parity bits do not match corresponding parity bits from the plurality of fourth sets of parity bits, where determining the error associated with the one or more data units of the plurality of data units is based at least in part on determining the one or more parity bits from the plurality of third sets of parity bits do not match the corresponding parity bits from the plurality of fourth sets of parity bits.

In some examples, the data storage unit storage component 675 may be configured as or otherwise support a means for storing the at least one data storage unit to a buffer. In some examples, the data storage unit writing component 680 may be configured as or otherwise support a means for writing the at least one data storage unit to the memory array of the memory system. In some examples, the write command response component 685 may be configured as or otherwise support a means for transmitting a message that the write command was successful.

In some examples, the indicator of the respective subset of the range of logical addresses is an offset indicator for the subset within the range of logical addresses.

In some examples, the plurality of protocol units each include a Universal Flash Storage Protocol Information Unit (UPIU).

In some examples, the command reception component 625 may be configured as or otherwise support a means for receiving, at a memory system, a read command for a range of logical addresses of a memory array of the memory system. In some examples, the data storage controller processing component 640 may be configured as or otherwise support a means for reading, from the memory array, at least one data storage unit corresponding to the range of logical addresses. The protocol unit generation component 650 may be configured as or otherwise support a means for generating a plurality of protocol units including data from the range of logical addresses corresponding to the at least one data storage unit. The data unit transmission component 655 may be configured as or otherwise support a means for transmitting one or more data units of a plurality of data units corresponding to each protocol unit of the plurality of protocol units. In some examples, the error detection component 645 may be configured as or otherwise support a means for determining an error associated with one or more protocol units of the plurality of protocol units. In some examples, the protocol unit generation component 650 may be configured as or otherwise support a means for regenerating the one or more protocol units associated with the error. In some examples, the data unit transmission component 655 may be configured as or otherwise support a means for transmitting the plurality of data units corresponding to the one or more protocol units based on the regenerating.

In some examples, to support determining the error, the parity bit comparison component 665 may be configured as or otherwise support a means for comparing respective sets of parity bits from the plurality of first sets of parity bits with respective sets of parity bits from a plurality of second sets of parity bits generated by a protocol controller. In some examples, to support determining the error, the parity bit comparison component 665 may be configured as or otherwise support a means for determining that one or more parity bits from the plurality of first sets of parity bits does not match corresponding parity bits from the plurality of second sets of parity bits, where determining the error associated with the one or more protocol units of the plurality of protocol units is based at least in part on determining that the one or more parity bits from the plurality of first sets of parity bits does not match the corresponding parity bits from the plurality of second sets of parity bits.

In some examples, the error detection component 645 may be configured as or otherwise support a means for determining an error associated with a data unit of the one or more data units of the plurality of data units. In some examples, the protocol unit generation component 650 may be configured as or otherwise support a means for regenerating the plurality of protocol units including data from the range of logical addresses corresponding to the at least one data storage unit. In some examples, the data unit transmission component 655 may be configured as or otherwise support a means for retransmitting the plurality of data units corresponding to the one or more protocol units based on the regenerating.

In some examples, the data unit parity identification component 690 may be configured as or otherwise support a means for identifying a plurality of third sets of parity bits associated with the plurality of data units. In some examples, the data unit parity generation component 695 may be configured as or otherwise support a means for generating a plurality of fourth sets of parity bits associated with the plurality of data units, where each data unit has a respective set of the fourth sets of parity bits. In some examples, the parity bit comparison component 665 may be configured as or otherwise support a means for comparing parity bits from the plurality of third sets of parity bits with corresponding parity bits from the plurality of fourth sets of parity bits. In some examples, the parity bit comparison component 665 may be configured as or otherwise support a means for determining one or more of the parity bits from the plurality of third sets of parity bits do not match the corresponding parity bits from the plurality of fourth sets of parity bits, where determining the error associated with the one or more data units of the plurality of data units is based at least in part on determining the one or more parity bits from the plurality of third sets of parity bits do not match the corresponding parity bits from the plurality of fourth sets of parity bits.

In some examples, the error detection component 645 may be configured as or otherwise support a means for determining an error associated with one or more data storage units of the at least one data storage unit. In some examples, the data storage controller processing component 640 may be configured as or otherwise support a means for rereading the one or more data storage units associated with the error.

In some examples, each protocol unit includes data from a set of logical addresses of the range of logical addresses and each data unit includes data from a subset of the set of logical addresses.

In some examples, each protocol unit includes an indicator of an offset corresponding to the set of logical addresses of the range of logical addresses, and each regenerated protocol unit includes an indicator of the offset.

In some examples, the plurality of protocol units each include a Universal Flash Storage Protocol Information Unit (UPIU).

Figure 7:
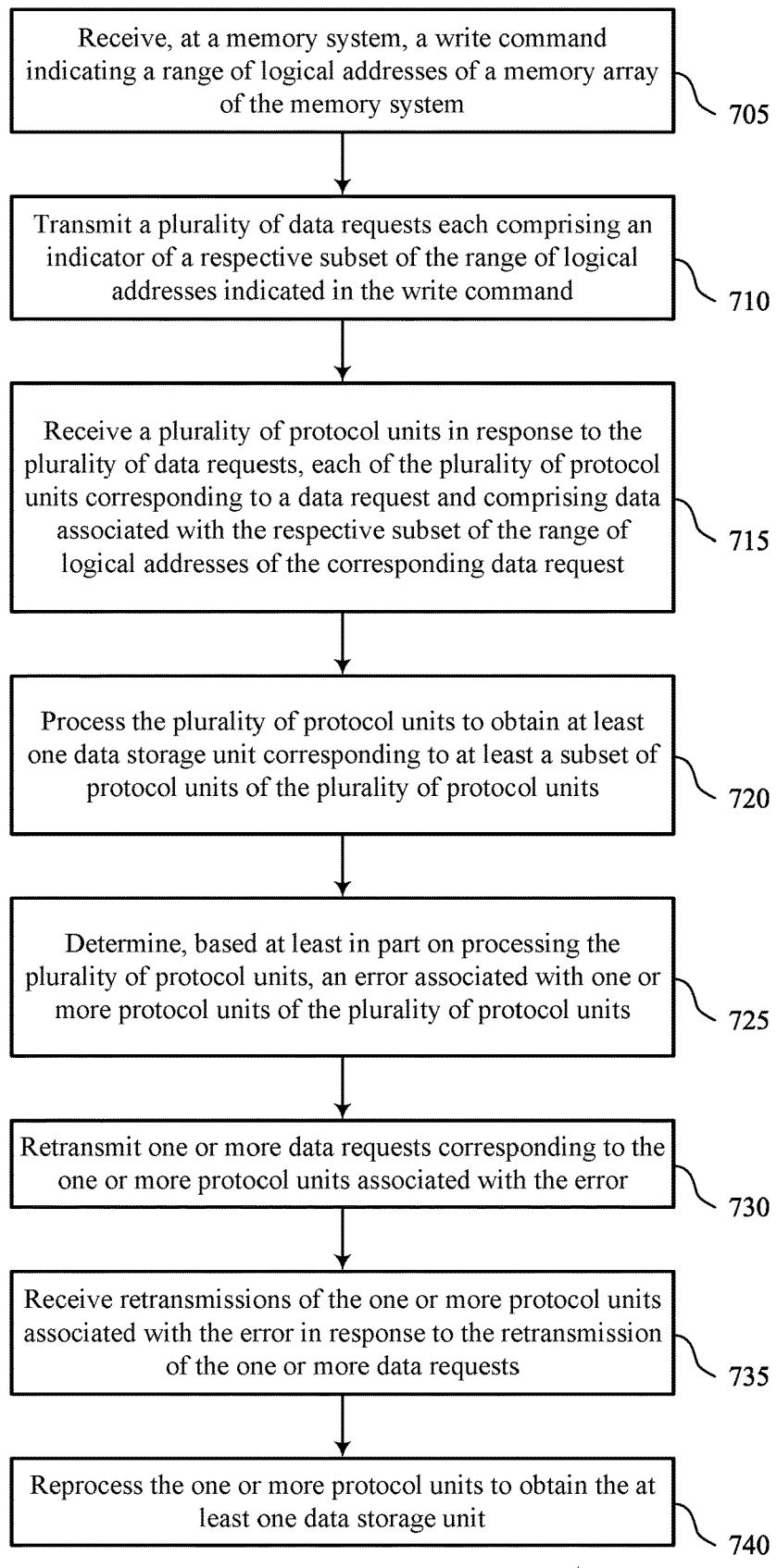
FIGS. 7 and 8 show flowcharts illustrating a method or methods that support data recovery using ordered data requests in accordance with examples as disclosed herein.

FIG. 7 shows a flowchart illustrating a method 700 that supports data recovery using ordered data requests in accordance with examples as disclosed herein. The operations of method 700 may be implemented by a memory system or its components as described herein. For example, the operations of method 700 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 705, the method may include receiving, at a memory system, a write command indicating a range of logical addresses of a memory array of the memory system. The operations of 705 may be performed in accordance with examples as disclosed herein. In some examples, aspects of the operations of 705 may be performed by a command reception component 625 as described with reference to FIG. 6.

At 710, the method may include transmitting a plurality of data requests each including an indicator of a respective subset of the range of logical addresses indicated in the write command. The operations of 710 may be performed in accordance with examples as disclosed herein. In some examples, aspects of the operations of 710 may be performed by a data request component 630 as described with reference to FIG. 6.

At 715, the method may include receiving a plurality of protocol units in response to the plurality of data requests, each of the plurality of protocol units corresponding to a data request and including data associated with the respective subset of the range of logical addresses of the corresponding data request. The operations of 715 may be performed in accordance with examples as disclosed herein. In some examples, aspects of the operations of 715 may be performed by a protocol unit reception component 635 as described with reference to FIG. 6.

At 720, the method may include processing the plurality of protocol units to obtain at least one data storage unit corresponding to at least a subset of protocol units of the plurality of protocol units. The operations of 720 may be performed in accordance with examples as disclosed herein. In some examples, aspects of the operations of 720 may be performed by a data storage controller processing component 640 as described with reference to FIG. 6.

At 725, the method may include determining, based at least in part on processing the plurality of protocol units, an error associated with one or more protocol units of the plurality of protocol units. The operations of 725 may be performed in accordance with examples as disclosed herein. In some examples, aspects of the operations of 725 may be performed by an error detection component 645 as described with reference to FIG. 6.

At 730, the method may include retransmitting one or more data requests corresponding to the one or more protocol units associated with the error. The operations of 730 may be performed in accordance with examples as disclosed herein. In some examples, aspects of the operations of 730 may be performed by a data request component 630 as described with reference to FIG. 6.

At 735, the method may include receiving retransmissions of the one or more protocol units associated with the error in response to the retransmission of the one or more data requests. The operations of 735 may be performed in accordance with examples as disclosed herein. In some examples, aspects of the operations of 735 may be performed by a protocol unit reception component 635 as described with reference to FIG. 6.

At 740, the method may include reprocessing the one or more protocol units to obtain the at least one data storage unit. The operations of 740 may be performed in accordance with examples as disclosed herein. In some examples, aspects of the operations of 740 may be performed by a data storage controller processing component 640 as described with reference to FIG. 6.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a memory system, a write command indicating a range of logical addresses of a memory array of the memory system; transmitting a plurality of data requests each including an indicator of a respective subset of the range of logical addresses indicated in the write command; receiving a plurality of protocol units in response to the plurality of data requests, each of the plurality of protocol units corresponding to a data request and including data associated with the respective subset of the range of logical addresses of the corresponding data request; processing the plurality of protocol units to obtain at least one data storage unit corresponding to at least a subset of protocol units of the plurality of protocol units; determining, based at least in part on processing the plurality of protocol units, an error associated with one or more protocol units of the plurality of protocol units; retransmitting one or more data requests corresponding to the one or more protocol units associated with the error; receiving retransmissions of the one or more protocol units associated with the error in response to the retransmission of the one or more data requests; and reprocessing the one or more protocol units to obtain the at least one data storage unit.

Aspect 2: The method, apparatus, or non-transitory computer-readable medium of aspect 1, where determining the error further includes operations, features, circuitry, logic, means, or instructions, or any combination thereof for generating a plurality of second sets of parity bits associated with the plurality of protocol units, where each protocol unit has a respective set of second parity bits; comparing respective parity bits from the plurality of first sets of parity bits with respective parity bits from the plurality of second sets of parity bits; and determining that one or more parity bits from the plurality of first sets of parity bits do not match corresponding parity bits from the plurality of second sets of parity bits, where determining the error associated with the one or more protocol units of the plurality of protocol units is based at least in part on determining that the one or more parity bits from the plurality of first sets of parity bits do not match the corresponding parity bits from the plurality of second sets of parity bits.

Aspect 3: The method, apparatus, or non-transitory computer-readable medium of any of aspects 1 through 2, where receiving the plurality of protocol units further includes operations, features, circuitry, logic, means, or instructions, or any combination thereof for receiving a plurality of data units in response to the plurality of data requests, where one or more of the plurality of data units corresponds to a data request and includes data associated with the respective subset of the range of logical addresses of the corresponding data request.

Aspect 4: The method, apparatus, or non-transitory computer-readable medium of aspect 3, further including operations, features, circuitry, logic, means, or instructions, or any combination thereof for identifying a plurality of third sets of parity bits associated with the plurality of data units; generating a plurality of fourth sets of parity bits associated with the plurality of data units; comparing respective parity bits from the plurality of third sets of parity bits with respective parity bits from the plurality of fourth sets of parity bits; and determining that one or more parity bits from the plurality of third sets of parity bits do not match corresponding parity bits from the plurality of fourth sets of parity bits, where determining the error associated with the one or more data units of the plurality of data units is based at least in part on determining the one or more parity bits from the plurality of third sets of parity bits do not match the corresponding parity bits from the plurality of fourth sets of parity bits.

Aspect 5: The method, apparatus, or non-transitory computer-readable medium of any of aspects 1 through 4, further including operations, features, circuitry, logic, means, or instructions, or any combination thereof for storing the at least one data storage unit to a buffer; writing the at least one data storage unit to the memory array of the memory system; and transmitting a message that the write command was successful.

Aspect 6: The method, apparatus, or non-transitory computer-readable medium of any of aspects 1 through 5, where the indicator of the respective subset of the range of logical addresses is an offset indicator for the subset within the range of logical addresses.

Aspect 7: The method, apparatus, or non-transitory computer-readable medium of any of aspects 1 through 6, where the plurality of protocol units each include a Universal Flash Storage Protocol Information Unit (UPIU).

Figure 8:
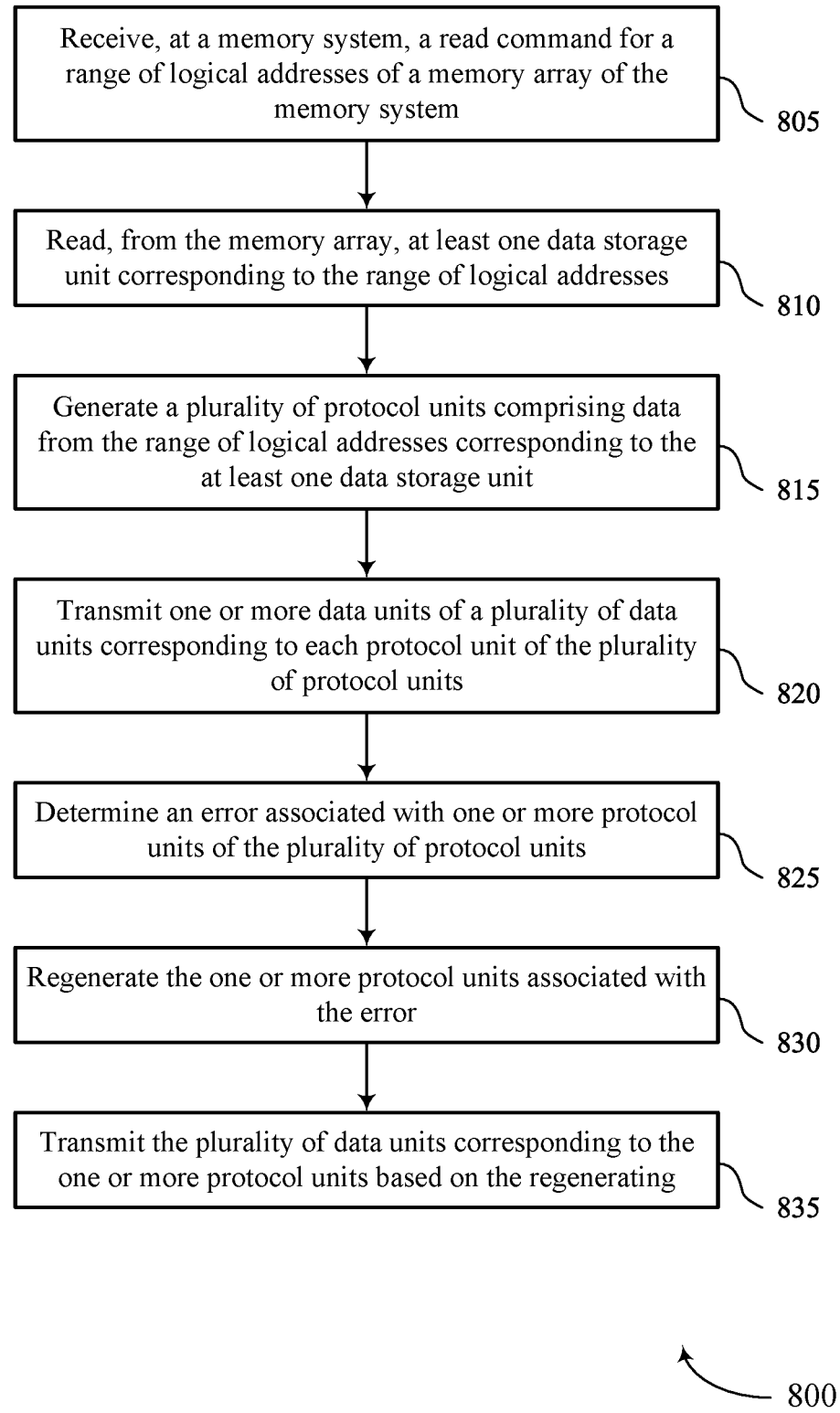

FIG. 8 shows a flowchart illustrating a method 800 that supports data recovery using ordered data requests in accordance with examples as disclosed herein. The operations of method 800 may be implemented by a memory system or its components as described herein. For example, the operations of method 800 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 805, the method may include receiving, at a memory system, a read command for a range of logical addresses of a memory array of the memory system. The operations of 805 may be performed in accordance with examples as disclosed herein. In some examples, aspects of the operations of 805 may be performed by a command reception component 625 as described with reference to FIG. 6.

At 810, the method may include reading, from the memory array, at least one data storage unit corresponding to the range of logical addresses. The operations of 810 may be performed in accordance with examples as disclosed herein. In some examples, aspects of the operations of 810 may be performed by a data storage controller processing component 640 as described with reference to FIG. 6.

At 815, the method may include generating a plurality of protocol units including data from the range of logical addresses corresponding to the at least one data storage unit. The operations of 815 may be performed in accordance with examples as disclosed herein. In some examples, aspects of the operations of 815 may be performed by a protocol unit generation component 650 as described with reference to FIG. 6.

At 820, the method may include transmitting one or more data units of a plurality of data units corresponding to each protocol unit of the plurality of protocol units. The operations of 820 may be performed in accordance with examples as disclosed herein. In some examples, aspects of the operations of 820 may be performed by a data unit transmission component 655 as described with reference to FIG. 6.

At 825, the method may include determining an error associated with one or more protocol units of the plurality of protocol units. The operations of 825 may be performed in accordance with examples as disclosed herein. In some examples, aspects of the operations of 825 may be performed by an error detection component 645 as described with reference to FIG. 6.

At 830, the method may include regenerating the one or more protocol units associated with the error. The operations of 830 may be performed in accordance with examples as disclosed herein. In some examples, aspects of the operations of 830 may be performed by a protocol unit generation component 650 as described with reference to FIG. 6.

At 835, the method may include transmitting the plurality of data units corresponding to the one or more protocol units based on the regenerating. The operations of 835 may be performed in accordance with examples as disclosed herein. In some examples, aspects of the operations of 835 may be performed by a data unit transmission component 655 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 8: A method, apparatus, or non-transitory computer-readable medium including operations, features, circuitry, logic, means, or instructions, or any combination thereof for receiving, at a memory system, a read command for a range of logical addresses of a memory array of the memory system; reading, from the memory array, at least one data storage unit corresponding to the range of logical addresses; generating a plurality of protocol units including data from the range of logical addresses corresponding to the at least one data storage unit; transmitting one or more data units of a plurality of data units corresponding to each protocol unit of the plurality of protocol units; determining an error associated with one or more protocol units of the plurality of protocol units; regenerating the one or more protocol units associated with the error; and transmitting the plurality of data units corresponding to the one or more protocol units based on the regenerating.

Aspect 9: The method, apparatus, or non-transitory computer-readable medium of aspect 8, where determining the error further includes operations, features, circuitry, logic, means, or instructions, or any combination thereof for comparing respective sets of parity bits from the plurality of first sets of parity bits with respective sets of parity bits from a plurality of second sets of parity bits generated by a protocol controller and determining that one or more parity bits from the plurality of first sets of parity bits does not match corresponding parity bits from the plurality of second sets of parity bits, where determining the error associated with the one or more protocol units of the plurality of protocol units is based at least in part on determining that the one or more parity bits from the plurality of first sets of parity bits does not match the corresponding parity bits from the plurality of second sets of parity bits.

Aspect 10: The method, apparatus, or non-transitory computer-readable medium of any of aspects 8 through 9, further including operations, features, circuitry, logic, means, or instructions, or any combination thereof for determining an error associated with a data unit of the one or more data units of the plurality of data units; regenerating the plurality of protocol units including data from the range of logical addresses corresponding to the at least one data storage unit; and retransmitting the plurality of data units corresponding to the one or more protocol units based on the regenerating.

Aspect 11: The method, apparatus, or non-transitory computer-readable medium of aspect 10, further including operations, features, circuitry, logic, means, or instructions, or any combination thereof for identifying a plurality of third sets of parity bits associated with the plurality of data units; generating a plurality of fourth sets of parity bits associated with the plurality of data units, where each data unit has a respective set of the fourth sets of parity bits; comparing parity bits from the plurality of third sets of parity bits with corresponding parity bits from the plurality of fourth sets of parity bits; and determining one or more of the parity bits from the plurality of third sets of parity bits do not match the corresponding parity bits from the plurality of fourth sets of parity bits, where determining the error associated with the one or more data units of the plurality of data units is based at least in part on determining the one or more parity bits from the plurality of third sets of parity bits do not match the corresponding parity bits from the plurality of fourth sets of parity bits.

Aspect 12: The method, apparatus, or non-transitory computer-readable medium of any of aspects 8 through 11, further including operations, features, circuitry, logic, means, or instructions, or any combination thereof for determining an error associated with one or more data storage units of the at least one data storage unit and rereading the one or more data storage units associated with the error.

Aspect 13: The method, apparatus, or non-transitory computer-readable medium of any of aspects 8 through 12, where each protocol unit includes data from a set of logical addresses of the range of logical addresses and each data unit includes data from a subset of the set of logical addresses.

Aspect 14: The method, apparatus, or non-transitory computer-readable medium of aspect 13, where each protocol unit includes an indicator of an offset corresponding to the set of logical addresses of the range of logical addresses, and each regenerated protocol unit includes an indicator of the offset.

Aspect 15: The method, apparatus, or non-transitory computer-readable medium of any of aspects 8 through 14, where the plurality of protocol units each include a Universal Flash Storage Protocol Information Unit (UPIU).

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
   one or more controllers associated with one or more memory devices, wherein the one or more controllers are configured to cause the memory system to:
   receive, at the memory system, a write command indicating a range of logical addresses of one or more memory arrays of the memory system;
   transmit a plurality of data requests each comprising an indicator of a respective subset of the range of logical addresses indicated in the write command; and
   retransmit one or more data requests of the plurality of data requests, the one or more data requests corresponding to one or more protocol units associated with an error.

2. The memory system of claim 1, wherein the one or more controllers are further configured to cause the memory system to:
   receive a plurality of protocol units in response to transmitting the plurality of data requests, each of the plurality of protocol units corresponding to a data request and comprising data associated with the respective subset of the range of logical addresses of the corresponding data request.

3. The memory system of claim 2, wherein the one or more controllers are further configured to cause the memory system to:
   process the plurality of protocol units to obtain at least one data storage unit.

4. The memory system of claim 3, wherein the one or more controllers are further configured to cause the memory system to:
   store the at least one data storage unit to a buffer;
   write the at least one data storage unit to the one or more memory arrays of the memory system; and
   transmit a message that the write command was successful.

5. The memory system of claim 3, wherein the one or more controllers are further configured to cause the memory system to:
   determine, based at least in part on processing the plurality of protocol units, the error associated with one or more protocol units of the plurality of protocol units.

6. The memory system of claim 5, wherein the one or more controllers are further configured to cause the memory system to:
   receive one or more retransmitted protocol units corresponding to the one or more protocol units associated with the error.

7. The memory system of claim 6, wherein the one or more controllers are further configured to cause the memory system to:
   identify a plurality of first sets of parity bits associated with the plurality of protocol units;
   generate a plurality of second sets of parity bits associated with the plurality of protocol units;
   compare respective parity bits from the plurality of first sets of parity bits with respective parity bits from the plurality of second sets of parity bits; and
   determine that one or more parity bits from the plurality of first sets of parity bits do not match corresponding parity bits from the plurality of second sets of parity bits, wherein determining the error associated with the one or more protocol units of the plurality of protocol units is based at least in part on determining the one or more parity bits from the plurality of first sets of parity bits do not match the corresponding parity bits from the plurality of second sets of parity bits.

8. The memory system of claim 6, wherein the retransmitted one or more data requests correspond to the one or more protocol units associated with the error.

9. The memory system of claim 6, wherein the one or more controllers are further configured to cause the memory system to:
   process the one or more retransmitted protocol units to obtain the at least one data storage unit.

10. A memory system, comprising:
    one or more controllers associated with one or more memory devices, wherein the one or more controllers are configured to cause the memory system to:
    read, from one or more memory arrays of the memory system, at least one data storage unit corresponding to a range of logical addresses;
    generate a plurality of protocol units comprising data from the at least one data storage unit, the plurality of protocol units corresponding to the range of logical addresses;
    transmit a plurality of data units corresponding to the plurality of protocol units;
    regenerate one or more protocol units of the plurality of protocol units based at least in part on a determination of an error associated with the one or more protocol units subsequent to transmission of at least one of the plurality of data units; and retransmit one or more data units associated with the one or more protocol units based at least in part on regenerating the one or more protocol units.

11. The memory system of claim 10, wherein the one or more controllers are further configured to cause the memory system to:
reread, from the one or more memory arrays, one or more data storage units of the at least one data storage unit in response to determining the error, the one or more data storage units corresponding to the one or more protocol units associated with the error, wherein regenerating the one or more protocol units associated with the error is based at least in part on re-reading the one or more data storage units.

12. The memory system of claim 10, wherein to determine the error, the one or more controllers are further configured to cause the memory system to:
compare respective sets of parity bits from a plurality of first sets of parity bits with respective sets of parity bits from a plurality of second sets of parity bits; and
determine that one or more parity bits from the plurality of first sets of parity bits does not match corresponding parity bits from the plurality of second sets of parity bits, wherein determining the error associated with the one or more protocol units of the plurality of protocol units is based at least in part on determining that the one or more parity bits from the plurality of first sets of parity bits does not match the corresponding parity bits from the plurality of second sets of parity bits.

13. The memory system of claim 10, wherein the one or more controllers are further configured to cause the memory system to:
determine an error associated with a data unit of the plurality of data units;
regenerate the plurality of protocol units corresponding to the at least one data storage unit, wherein the regenerated plurality of protocol units comprise data from the range of logical addresses corresponding to the at least one data storage unit; and
retransmit the plurality of data units corresponding to the one or more protocol units based at least in part on regenerating the plurality of protocol units.

14. The memory system of claim 13, wherein the one or more controllers are further configured to cause the memory system to:
identify a plurality of third sets of parity bits associated with the plurality of data units;
generate a plurality of fourth sets of parity bits associated with the plurality of data units, wherein each data unit has a respective set of the plurality of fourth sets of parity bits;
compare parity bits from the plurality of third sets of parity bits with corresponding parity bits from the plurality of fourth sets of parity bits; and
determine one or more of the parity bits from the plurality of third sets of parity bits do not match the corresponding parity bits from the plurality of fourth sets of parity bits, wherein determining the error associated with the data unit of the plurality of data units is based at least in part on determining that one or more of the parity bits from the plurality of third sets of parity bits do not match the corresponding parity bits from the plurality of fourth sets of parity bits.

15. A method, comprising:
reading, from one or more memory arrays of a memory system, at least one data storage unit corresponding to a range of logical addresses;
generating a plurality of protocol units comprising data from the at least one data storage unit, the plurality of protocol units corresponding to the range of logical addresses;
transmitting a plurality of data units corresponding to the plurality of protocol units;
regenerating one or more protocol units of the plurality of protocol units based at least in part on a determination of an error associated with the one or more protocol units subsequent to transmission of at least one of the plurality of data units; and
retransmitting one or more data units associated with the one or more protocol units based at least in part on regenerating the one or more protocol units.

16. The method of claim 15, further comprising:
rereading, from the one or more memory arrays, one or more data storage units of the at least one data storage unit in response to determining the error, the one or more data storage units corresponding to the one or more protocol units associated with the error, wherein regenerating the one or more protocol units associated with the error is based at least in part on re-reading the one or more data storage units.

17. The method of claim 15, wherein determining the error comprises:
comparing respective sets of parity bits from a plurality of first sets of parity bits with respective sets of parity bits from a plurality of second sets of parity bits; and
determining that one or more parity bits from the plurality of first sets of parity bits does not match corresponding parity bits from the plurality of second sets of parity bits, wherein determining the error associated with the one or more protocol units of the plurality of protocol units is based at least in part on determining that the one or more parity bits from the plurality of first sets of parity bits does not match the corresponding parity bits from the plurality of second sets of parity bits.

18. The method of claim 15, further comprising:
determining an error associated with a data unit of the plurality of data units;
regenerating the plurality of protocol units corresponding to the at least one data storage unit, wherein the regenerated plurality of protocol units comprise data from the range of logical addresses corresponding to the at least one data storage unit; and
retransmitting the plurality of data units corresponding to the one or more protocol units based at least in part on regenerating the plurality of protocol units.

19. The method of claim 18, further comprising:
identifying a plurality of third sets of parity bits associated with the plurality of data units; and
generating a plurality of fourth sets of parity bits associated with the plurality of data units, wherein each data unit has a respective set of the plurality of fourth sets of parity bits.

20. The method of claim 19, further comprising:
comparing parity bits from the plurality of third sets of parity bits with corresponding parity bits from the plurality of fourth sets of parity bits; and
determining one or more of the parity bits from the plurality of third sets of parity bits do not match the corresponding parity bits from the plurality of fourth sets of parity bits, wherein determining the error associated with the data unit of the plurality of data units is based at least in part on determining that one or more of the parity bits from the plurality of third sets of parity bits do not match the corresponding parity bits from the plurality of fourth sets of parity bits.

\* \* \* \* \*